United States Patent
Chae et al.

(10) Patent No.: US 11,082,961 B2
(45) Date of Patent: Aug. 3, 2021

(54) APPARATUS AND METHOD FOR SIGNALING CONTROL INFORMATION RELATED TO TRANSMISSION SCHEME IN WIRELESS COMMUNICATION SYSTEM

(71) Applicant: Samsung Electronics Co., Ltd., Suwon-si (KR)

(72) Inventors: Sungho Chae, Seoul (KR); Cheol Jeong, Seongnam-si (KR); Seok-Ki Ahn, Suwon-si (KR); Min Jang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 222 days.

(21) Appl. No.: 16/327,241

(22) PCT Filed: Aug. 21, 2017

(86) PCT No.: PCT/KR2017/009072
§ 371 (c)(1),
(2) Date: Feb. 21, 2019

(87) PCT Pub. No.: WO2018/038476
PCT Pub. Date: Mar. 1, 2018

(65) Prior Publication Data
US 2019/0200348 A1    Jun. 27, 2019

(30) Foreign Application Priority Data
Aug. 22, 2016    (KR) ........................ 10-2016-0106415

(51) Int. Cl.
*H04W 72/04*    (2009.01)
*H04L 25/06*    (2006.01)
(Continued)

(52) U.S. Cl.
CPC .......... *H04W 72/0413* (2013.01); *H04L 1/00* (2013.01); *H04L 5/0007* (2013.01);
(Continued)

(58) Field of Classification Search
None
See application file for complete search history.

(56) References Cited

U.S. PATENT DOCUMENTS

2005/0063471 A1*    3/2005  Regunathan ........... H04N 19/61
                                                        375/240.21
2005/0149843 A1*    7/2005  Shen ................... H03M 13/1102
                                                        714/800
(Continued)

OTHER PUBLICATIONS

ISA/KR, "International Search Report and Written Opinion of the International Searching Authority," International Application No. PCT/KR2017/009072, dated Dec. 5, 2017, 12 pages.
(Continued)

*Primary Examiner* — Kodzovi Acolatse

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). The objective of the present disclosure is to signal control information necessary for selecting a transmission scheme in a wireless communication system. An method for operating a transmitting end includes, receiving capability information related to a receiver of a receiving end; transmitting control information related to a transmission scheme used for processing data determined based on the capability information; and transmitting a generated data signal by using the transmission scheme. The capability information comprises a rule for combining channel coding and a modulation and/or a rule for bit and symbol mapping.

17 Claims, 18 Drawing Sheets

(51) Int. Cl.
    *H04L 5/00*     (2006.01)
    *H04L 1/00*     (2006.01)
    *H04L 25/03*     (2006.01)
    *H04L 25/49*     (2006.01)
    *H04W 8/24*     (2009.01)

(52) U.S. Cl.
    CPC .......... *H04L 5/0048* (2013.01); *H04L 5/0069* (2013.01); *H04L 5/0085* (2013.01); *H04L 25/03949* (2013.01); *H04L 25/067* (2013.01); *H04L 25/4917* (2013.01); *H04W 8/24* (2013.01)

(56) References Cited

U.S. PATENT DOCUMENTS

| | | | |
|---|---|---|---|
| 2008/0062018 A1* | 3/2008 | Normile | H04N 19/156 |
| | | | 341/50 |
| 2011/0026615 A1 | 2/2011 | Miyoshi et al. | |
| 2011/0261904 A1* | 10/2011 | Seier | H04L 1/0009 |
| | | | 375/298 |
| 2011/0302236 A1* | 12/2011 | Shrum, Jr. | H04N 21/2343 |
| | | | 709/203 |
| 2014/0112262 A1 | 4/2014 | Mallik et al. | |
| 2014/0233673 A1* | 8/2014 | Smith | H03M 13/1515 |
| | | | 375/296 |
| 2015/0091742 A1* | 4/2015 | Ionita | H03M 13/251 |
| | | | 341/57 |
| 2015/0124750 A1* | 5/2015 | Vermani | H04W 84/12 |
| | | | 370/329 |
| 2015/0131554 A1 | 5/2015 | Jiang et al. | |
| 2015/0358194 A1 | 12/2015 | Yu et al. | |
| 2016/0044638 A1 | 2/2016 | Gao et al. | |
| 2017/0026976 A1* | 1/2017 | Yoo | H04W 72/042 |
| 2017/0126354 A1* | 5/2017 | Marsland | H04L 1/0009 |
| 2018/0034677 A1* | 2/2018 | Limberg | H04L 27/38 |
| 2019/0372710 A1* | 12/2019 | Chen | H04W 72/04 |

OTHER PUBLICATIONS

Samsung, "Discussion on Advanced MIMO Transceivers for NR," R1-164012, 3GPP TSG RAN WG1 #85, Nanjing, China, May 23-27, 2016, 6 pages.

* cited by examiner

APPARATUS AND METHOD FOR SIGNALING CONTROL INFORMATION RELATED TO TRANSMISSION SCHEME IN WIRELESS COMMUNICATION SYSTEM

CROSS-REFERENCE TO RELATED APPLICATIONS

This application is a 371 National Stage of International Application No. PCT/KR2017/009072, filed Aug. 21, 2017, which claims priority to Korean Patent Application No. 10-2016-0106415, filed Aug. 22, 2016, the disclosures of which are herein incorporated by reference in their entirety.

BACKGROUND

1. Field

The present disclosure relates generally to a wireless communication system and, more particularly, to an apparatus and a method for signaling control information related to a transmission scheme in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a wireless communication system, the transmission of a signal through a wireless channel may be performed between a base station and a terminal, between a terminal and a terminal, and between a base station and a base station. Since a wireless channel is exposed to various types of noises and interferences, various transmission schemes may be used for effective transmission.

An optimal transmission scheme may change according to the environment of a wireless channel. However, due to the complexity of system design or limitations on standards, and the like, transmission schemes supportable in one system may be limited. Further, even when a system supports multiple transmission schemes, if the system fails to adaptively change a transmission scheme according to various environments, the performance of the system is limited.

SUMMARY

The present disclosure provides an apparatus and a method for selecting an appropriate scheme from various transmission schemes in a wireless communication system based on the above-mentioned discussion.

Also, the present disclosure provides an apparatus and a method for signaling control information necessary to select a transmission scheme in a wireless communication system.

Also, the present disclosure provides an apparatus and a method for transmitting information on a transmission scheme in a wireless communication system.

Also, the present disclosure provides an apparatus and a method for transmitting information on a preferred transmission scheme in a wireless communication system.

Also, the present disclosure provides an apparatus and a method for determining a transmission scheme by considering the capability of a receiver in a wireless communication system.

Further, the present disclosure provides an apparatus and a method for determining a transmission scheme by considering channel information in a wireless communication system.

In accordance with an aspect of the present disclosure, there is provided a method for operating a transmitting node in a wireless communication system, the method including: receiving capability information related to a receiver of a receiving node; transmitting control information on a transmission scheme for processing data determined based on the capability information; and transmitting a data signal generated using the transmission scheme.

In accordance with another aspect of the present disclosure, there is provided a method for operating a receiving node in a wireless communication system, the method including: transmitting capability information related to a receiver of the receiving node; receiving control information on a transmission scheme for processing data determined based on the capability information; and receiving the data signal generated using the transmission scheme.

In accordance with still another aspect of the present disclosure, there is provided an apparatus of a transmitting node in a wireless communication system, the apparatus including: a transmission/reception unit configured to receive capability information related to a receiver of a receiving node, transmit control information on a transmission scheme for processing data determined based on the capability information, and transmit a data signal generated using the transmission scheme.

In accordance with yet another aspect of the present disclosure, there is provided an apparatus of a receiving node in a wireless communication system, the apparatus including: a transmission/reception unit configured to transmit capability information related to a receiver of the receiving node, receive control information on a transmission scheme for processing data determined based on the capability information, and receive a data signal generated using the transmission scheme.

In the operating methods and the apparatuses, the capability information includes at least one of: a rule for combination of channel coding and modulation; and a rule for bit-to-symbol mapping. Also, the transmission scheme may include signal processing rules which become a condition for use of a reception algorithm which is usable by the receiving node and is checked by the capability information. For example, the capability information may indicate a signal processing rule required to use an Integer Forcing (IF) reception algorithm using an effective channel matrix converted into an integer matrix by using an equalization matrix.

When multiple transmission schemes for processing a data signal are supported, an apparatus and a method according to various embodiments of the present disclosure adaptively changes a transmission scheme according to an environment and thus can improve data transmission efficiency. Advantageous effects obtained in the present disclosure are not limited to the above-mentioned effects, and other effects not mentioned above can be clearly understood from the following description by those having common knowledge in the technical field to which the present disclosure pertains.

DETAILED DESCRIPTION

The terms as used in the present disclosure are merely used to describe particular embodiments and are not intended to limit the scope of other embodiments. A singular expression may include a plural expression unless the context clearly indicates otherwise. All terms used herein, including technical terms and scientific terms, have the same meanings as commonly understood by those having common knowledge in the technical field to which the present disclosure pertains. Such terms as those defined in a generally-used dictionary among the terms as used in the present disclosure are to be interpreted to have the meanings identical or similar to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

In various embodiments of the present disclosure as described hereinafter, a hardware-based approach will be described as an example. However, various embodiments of the present disclosure include technology that uses both hardware and software and thus do not exclude a software-based approach.

Hereinafter, the present disclosure relates to an apparatus and a method for signaling control information related to a transmission scheme in a wireless communication system. Specifically, the present disclosure will describe technology for exchanging control information related to signal processing and selecting a transmission scheme and a reception algorithm in a wireless communication system supporting multiple transmission schemes and reception algorithms.

Terms used in the following description, including a term referring to signal processing scheme/technology, a term referring to a unit of data, terms referring to network entities, a term referring to an element of an apparatus, and the like, are exemplified for convenience of description. Accordingly, the present disclosure is not limited to the following terms and other terms having equivalent meanings may be used.

Also, in the present disclosure, various embodiments are described using a Long-Term Evolution (LTE) system and an LTE-Advanced (LTE-A) system, but this configuration is only an example for description. Various embodiments of the present disclosure may also be easily modified and applied in another communication system.

Figure 1:
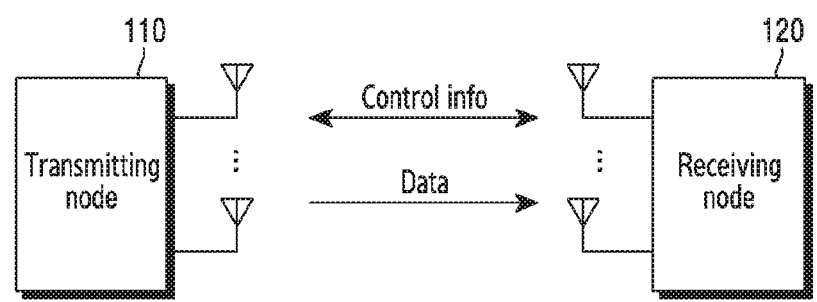
FIG. 1 illustrates a wireless communication system according to various embodiments of the present disclosure.

FIG. 1 illustrates a wireless communication system according to various embodiments of the present disclosure. Referring to FIG. 1, the wireless communication system includes a transmitting node 110 and a receiving node 120.

Referring to FIG. 1, the transmitting node 110 may be configured to transmit control information to the receiving node 120 and transmit data thereto. Also, the receiving node 120 may be configured to transmit control information to the transmitting node 110 and receive data therefrom. In the present example, control information may include at least one piece of information among channel-related information, receiver-related capability information, transmitter-related capability information, information related to a transmission scheme to be applied to data, information related to a desired transmission scheme, and resource allocation-related information.

The transmitting node 110 is configured to support multiple transmission schemes. In the present example, transmission schemes are signal processing technologies applied during conversion of transmission data into a wireless signal, and are related to a procedure, including channel coding and modulation, analog conversion, frequency conversion, and the like. That is, a transmission scheme signifies one signal processing rule for processing transmission data or a combination of signal processing rules. Specifically, transmission schemes may be defined as at least one or two combinations of a rule for combination of channel coding and modulation, a rule for bit-to-symbol mapping, a rule for mapping between a symbol and an antenna, a rule for resource mapping, a rule for resource allocation, and a rule for reference signal (RS) allocation. The transmitting node 110 may select one of multiple transmission schemes based on control information received from the receiving node 120 and information measured by the transmitting node 110, and may apply the same to transmission data.

The rule for combination of channel coding and modulation defines a corresponding relationship between an encoded code block, that is, a codeword, and a modulated symbol. In other words, the rule for combination of channel coding and modulation defines how bits for generation of one modulated symbol are extracted from codewords. The rule for combination of channel coding and modulation may be referred to as "coded modulation", "codeword-to-symbol mapping rule", or "bit extraction rule".

The rule for bit-to-symbol mapping defines a corresponding relationship between bit values and a constellation point. The rule for bit-to-symbol mapping defines a constellation point to which bit values corresponding to one modulated symbol are mapped. The rule for bit-to-symbol mapping may be referred to as "bit values-to-constellation point mapping rule", "constellation determination rule", or "constellation mapping rule".

The receiving node 120 supports multiple reception algorithms. For example, the receiving node 120 may support at least one of Maximum Likelihood (ML), Zero Forcing (ZF), Minimum Mean Square Error (MMSE), MMSE-Successive Interference Cancellation (SIC), Integer-Forcing (IF) decoding, and IF detection. IF decoding and IF detection are algorithms based on the integerization of an effective channel matrix. The receiving node 120 may select one of multiple reception algorithms based on control information received from the receiving node 120 or information measured by the transmitting node 110, and may use the same to process the received data.

The transmitting node 110 and the receiving node 120 are distinguished from each other according to a direction in which data is transmitted. Accordingly, one apparatus may operate as the transmitting node 110 or the receiving node 120 according to circumstances. For example, during downlink communication, the transmitting node 110 may be a base station and the receiving node 120 may be a terminal. As another example, during uplink communication, the transmitting node 110 may be a terminal and the receiving node 120 may be a base station. Alternatively, during Device-to-Device (D2D) communication, the transmitting node 110 may be a terminal and the receiving node 120 may be another terminal. In the present example, D2D communication may be referred to as "sidelink communication". Also, the transmitting node 110 may be a base station and the receiving node 120 may be another base station. In addition to the above-described examples, the transmitting node 110 and the receiving node 120 may be various other apparatuses.

Figure 2:
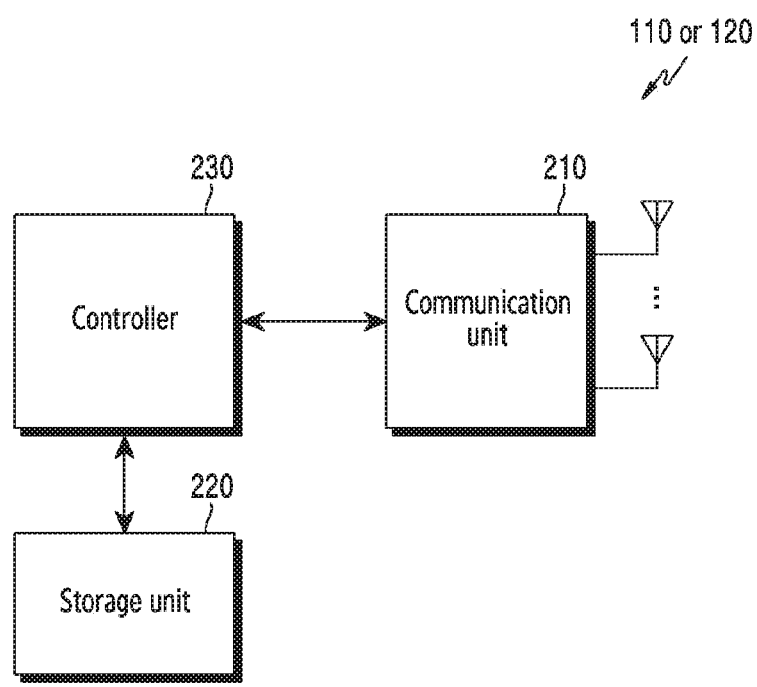
FIG. 2 illustrates a configuration of a transmitting node or a receiving node in a wireless communication system according to various embodiments of the present disclosure.

FIG. 2 illustrates a configuration of a transmitting node or a receiving node in a wireless communication system according to various embodiments of the present disclosure. The term " . . . unit" or the ending of a word such as " . . . or", " . . . er", or the like, which is used hereinafter, may signify a unit of processing at least one function or operation, and this configuration may be implemented in hardware, software, or as a combination of hardware and software. Referring to FIG. 2, the transmitting node 110 or the receiving node 120 includes a communication unit 210, a storage unit 220, and a controller 230.

The communication unit 210 is configured to perform a function of transmitting or receiving a signal through a wireless channel. For example, the communication unit 210 performs a function of conversion between a baseband signal and a bit sequence according to a physical layer standard of the system. For example, when data is transmitted, the communication unit 210 generates modulated symbols by encoding and modulating a transmission bit sequence. Also, when data is received, the communication unit 210 reconstructs a reception bit sequence by demodulating and decoding a baseband signal. Also, the communication unit 210 up-converts a baseband signal into a Radio Frequency (RF) band signal and then transmits the same through an antenna, and down-converts an RF band signal received through an antenna into a baseband signal. For example, the communication unit 210 may include an encoder, a decoder, a modulator, a demodulator, a Digital-to-Analog converter (DAC), an Analog-to-Digital converter (ADC), a transmission filter, a reception filter, an amplifier, a mixer, an oscillator, and the like.

Also, the communication unit 210 may include multiple RF chains. Further, the communication unit 210 may perform beamforming. For beamforming, the communication unit 210 may perform adjustment of the phase and magnitude, that is, analog beamforming, of each of signals transmitted or received through multiple antennas or antenna elements. Alternatively, the communication unit 210 may perform beamforming for a digital signal, that is, digital beamforming.

Also, the communication unit 210 may include different communication modules in order to process signals in different frequency bands. Further, the communication unit 210 may include multiple communication modules in order to support multiple different radio access technologies. For example, different radio access technologies may include Bluetooth Low Energy (BLE), Wi-Fi, Wi-Fi Gigabyte (WiGig), a cellular network (e.g., an LTE, LTE-A, or 5G network), and the like. Also, different frequency bands may include a Super-High Frequency (SHF) (e.g., 2.5 GHz or 5 GHz) band, a mmWave (e.g., 30 GHz or 60 GHz) band.

The communication unit 210 is configured to transmit and receive signals as described above. Accordingly, the communication unit 210 may be referred to as a "transmitter", "receiver", or "transceiver". Also, in the following description, transmission and reception performed through a wireless channel has a meaning including the execution of the above-described processing by the communication unit 210.

The storage unit 220 is configured to store data, including a basic program, an application program, configuration information, and the like for an operation of the transmitting node 110 or the receiving node 120. The storage unit 220 may be implemented by a volatile memory, a non-volatile memory, or a combination of a volatile memory and a non-volatile memory. Also, the storage unit 220 provides stored data at a request of the controller 230.

The controller 230 is configured to control overall operations of the transmitting node 110 or the receiving node 120. For example, the controller 230 transmits and receives signals through the communication unit 210. Also, the controller 230 records data in the storage unit 220 and reads the recorded data therefrom. To this end, the controller 230 may include at least one of a processor and a microprocessor, or may be a part of a processor. Also, a part of the communication unit 210 or the controller 230 may be referred to as a "Communication Processor (CP)". In particular, the controller 230 controls the transmitting node 110 or the receiving node 120 to exchange control information and select a transmission scheme or a reception algorithm, according to various embodiments described below. For example, the controller 230 may control the transmitting node 110 or the receiving node 120 to perform a procedure according to various embodiments described below.

FIG. 2 illustrates an example of a configuration of the transmitting node 110 or the receiving node 120. In the present example, when the configuration of FIG. 2 is that of a base station, the configuration of FIG. 2 may further include a backhaul communication unit which provides an interface configured to perform communication with a backhaul network.

Figure 3A:
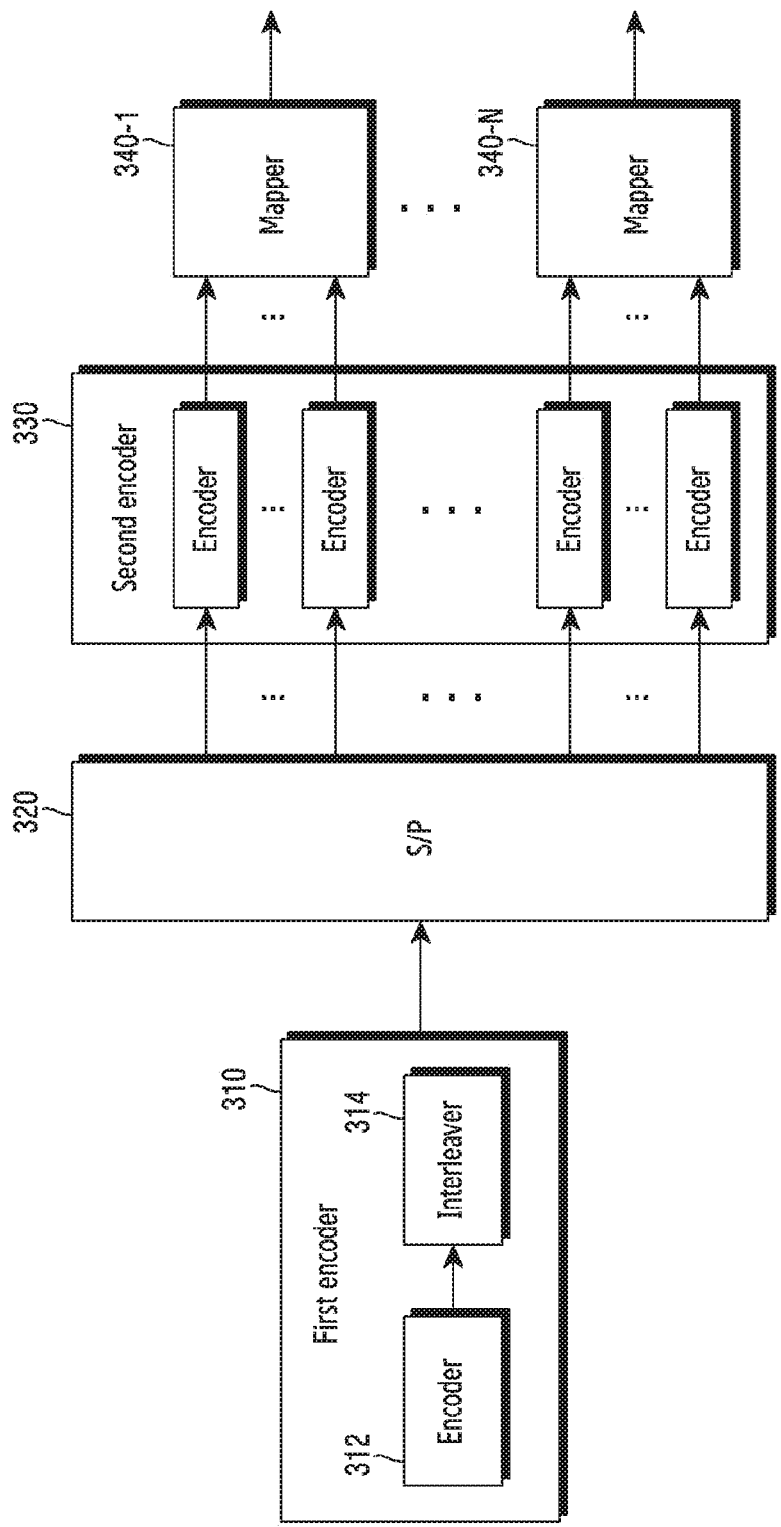
FIGS. 3A to 3C each illustrate a structure of a transmitting node for processing a transmission signal in a wireless communication system according to various embodiments of the present disclosure.
Figure 3B:
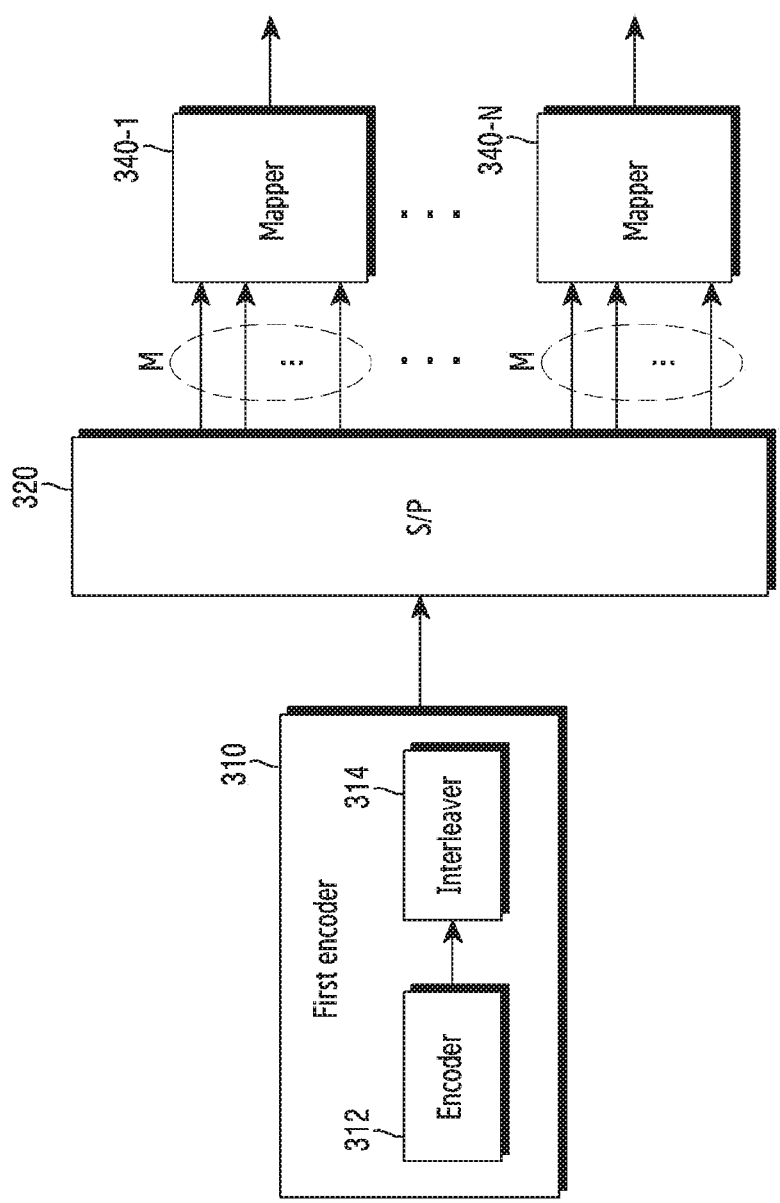
Figure 3C:
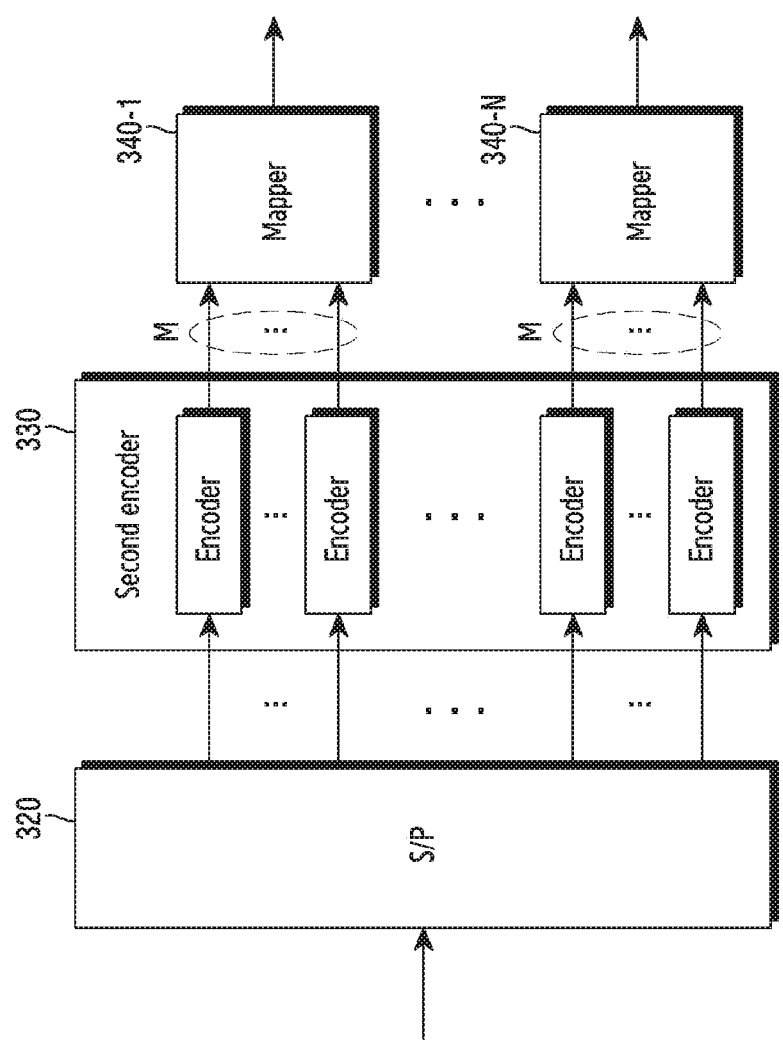

FIGS. 3A to 3C each illustrate a structure of a transmitting node for processing a transmission signal in a wireless communication system according to various embodiments of the present disclosure. FIG. 3A illustrates an example of a structure of a transmitter supporting Multi-Level Coding (MLC) and Bit-Interleaved Coded Modulation (BICM). MLC and BICM are technologies for combination of channel coding and modulation.

Referring to FIG. 3A, the transmitting node 110 includes a first encoder 310, a Serial-to-Parallel (S/P) converter 320, a second encoder 330, and multiple mappers 340-1 to 340-N. The first encoder 310 is a block for BICM, and the second encoder 330 is a block for MLC. Accordingly, one of the first encoder 310 and the second encoder 330 is used according to a selected coded modulation method. The S/P converter 320 outputs, in parallel, input bits. Each of the multiple mappers 340-1 to 340-N is configured to map encoded bits to a modulated symbol.

When BICM is selected as a coded modulation method, the transmitting node 110 performs encoding and modulation according to the structure as illustrated in FIG. 3B. When the number of bits for generation of one modulated symbol is M, BICM is a method for interleaving an output of a channel encoder on a bit-by-bit basis and then mapping M bits to one modulated symbol. To this end, the first encoder 310 includes an encoder 312 and an interleaver 314. The encoder 312 channel-codes input bits and the interleaver 314 interleaves the channel-coded bits output from the encoder 312. Then, the interleaved bits are parallelized through the S/P converter 320 and M bits are input to each of the multiple mappers 340-1 to 340-N. The multiple mappers 340-1 to 340-N are configured to generate N modulated symbols.

When MLC is selected as a coded modulation method, the transmitting node 110 performs encoding and modulation according to the structure as illustrated in FIG. 3C. MLC is a method for performing channel coding at each bit level constituting a modulated symbol. To this end, the second encoder 330 includes multiple encoders. In the present example, the multiple encoders constitute N groups, and each group provides M bits to a corresponding mapper among the multiple mappers 340-1 to 340-N. Encoders belonging to one group may be identical encoders or encoders differing in at least one of a coding rate and a coding scheme. In FIG. 3C, N×M encoders are illustrated for convenience of description, but the second encoder 330 may include M encoders. In the present example, each of the M encoders distributes each bit of an encoded code block to a corresponding mapper among the multiple mappers 340-1 to 340-N. Alternatively, the second encoder 330 may include one encoder. In this configuration, one encoder repeatedly performs encoding, and then distributes respective bits of an encoded code block to the multiple mappers 340-1 to 340-N.

Figure 4A:
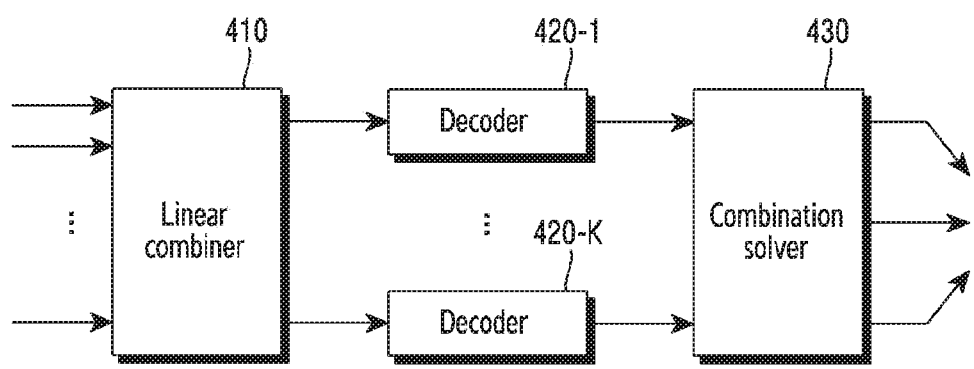
FIGS. 4A and 4B each illustrate a structure of a receiving node for processing a received signal in a wireless communication system according to various embodiments of the present disclosure.
Figure 4B:
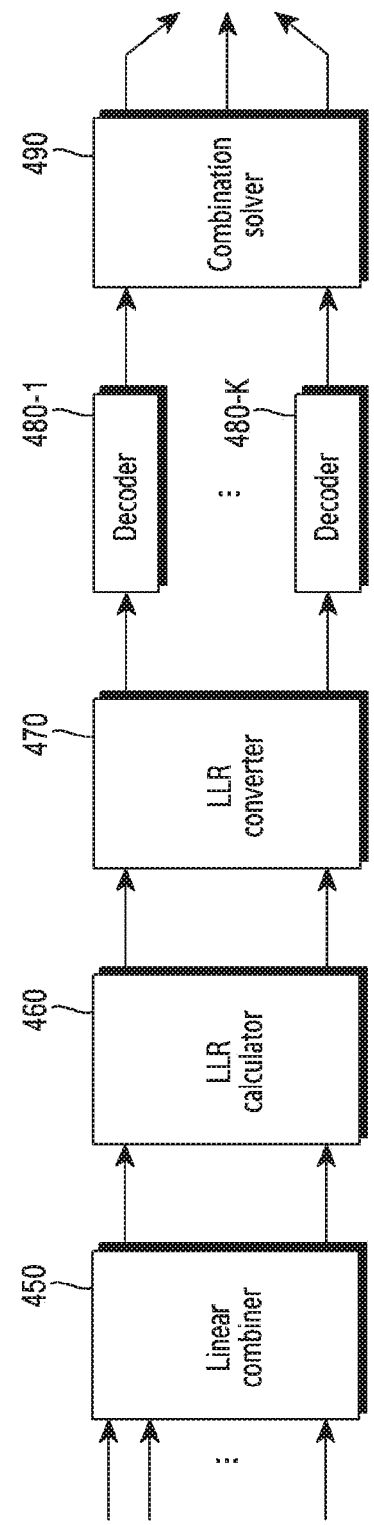

FIGS. 4A and 4B each illustrate a structure of a receiving node for processing a received signal in a wireless communication system according to various embodiments of the present disclosure.

FIG. 4A illustrates an example of a structure of a receiver supporting IF decoding. Referring to FIG. 4A, the receiving node 120 includes a linear combiner 410, decoders 420-1 to 420-K, and a combination solver 430. The linear combiner 410 may be referred to as a "linear equalizer", and the combination solver 430 may be referred to as a "linear equation solver".

The linear combiner 410 is configured to multiply antenna-specific received signals, received through a wireless channel, by an equalization matrix. An equalization matrix is used to convert an effective channel matrix into an integer matrix. Also, an equalization matrix may be used to reduce effective noise and convert an effective channel matrix into a full-rank matrix. Accordingly, the product of an equalization matrix and a channel matrix may be referred to as an "integerized effective channel matrix" or "integer-valued matrix". To this end, the linear combiner 410 is configured to determine an equalization matrix based on a channel matrix, channel quality, and the like, or receives an equalization matrix from another block within the receiving node 120. According to calculation by the linear combiner 410, signals representing linearly-added codewords and signals obtained by adding effective noises are output. Calculation by the linear combiner 410 generates combined codewords, differently from channel inversion performed by a linear reception algorithm such as ZF or MMSE. In other words, other codewords generated through a combination of codewords transmitted by the transmitting node 110 are output. In the present example, the other codewords may also constitute effective codewords.

The decoders 420-1 to 420-K are configured to decode combined codewords output from the linear combiner 410. In the present example, each of the decoders 420-1 to 420-K may operate as a Single-Input Single-Output (SISO) decoder. In other words, each of the decoders 420-1 to 420-K is configured to perform decoding without regard to interference from another antenna.

The combination solver 430 is configured to perform inverse conversion, which corresponds to a combination performed by the linear combiner 410, of a decoding result output from the decoders 420-1 to 420-K. That is, the combination solver 430 is configured to solve the combination of bits by the linear combiner 410. Accordingly, it is possible to estimate bits before being encoded of codewords generated by the transmitting node 110. That is, the combination solver 430 is configured to output estimated bits of the bits before being encoded of the codewords generated by the transmitting node 110.

FIG. 4A illustrates a structure of an IF decoding algorithm which is one type of an IF reception algorithm. IF detection is of another type of an IF reception algorithm. FIG. 4B illustrates an example of a structure of a receiver supporting IF detection. Referring to FIG. 4B, the receiving node 120 includes a linear combiner 450, a Log Likelihood Ratio (LLR) calculator 460, an LLR converter 470, decoders 480-1 to 480-K, and a combination solver 490. The linear combiner 410 may be referred to as a "linear equalizer", and the combination solver 430 may be referred to as a "linear equation solver".

The linear combiner 450 is configured to multiply antenna-specific received signals, received through a wireless channel, by an equalization matrix. According to calculation by the linear combiner 410, signals representing linearly-added codewords and signals obtained by adding effective noises are output. Accordingly, other codewords generated through a combination of codewords transmitted by the transmitting node 110 are output. In the present example, differently from the linear combiner 410 of FIG. 4A, the linear combiner 450 may generate a different integerized effective channel matrix at every time point t. That is, an IF decoding algorithm used one integerized effective channel matrix, but an IF detection algorithm uses multiple integerized effective channel matrices. For example, when a channel matrix for a t-th received signal is $H_t$, $H_t$ is multiplied by $B_t$ through linear equalization (t=1, 2, . . . , T). Accordingly, integerized effective channel matrices $A_1$, $A_2$, $A_3$, . . . , $A_T$ are generated. That is, an integerized effective channel matrix may change according to a time point t.

The LLR calculator 460 is configured to calculate LLR values by using a given integerized effective channel matrix. That is, when $A_t$ is determined by the linear combiner 450, the LLR calculator 460 calculates LLR values of symbol summation for each reception antenna in relation to a t-th received signal by using $A_t$.

The LLR converter 470 is configured to convert the LLR values so as to fit a new effective channel matrix. A new effective channel matrix is a new integer-valued matrix $\overline{A}$. In the present example, a new integer-valued matrix $\overline{A}$ may be pre-defined. For example, a new integer-valued matrix $\overline{A}$ may be defined as an identity matrix. That is, the LLR converter 470 converts LLR values of corresponding to $A_t$ into LLR values of symbol summation through a new integer-valued matrix $\overline{A}$. Then, an operation of the above-described IF decoding algorithm is applied to the converted LLR values.

The decoders 480-1 to 480-K are configured to decode codewords by using LLR values output from the LLR converter 470. In the present example, each of the decoders 480-1 to 480-K may operate as an SISO decoder. Also, the combining solver 490 is configured to perform inverse conversion, which corresponds to a combination through the new integer-valued matrix $\hat{A}$, of a decoding result output from the decoders 480-1 to 480-K. When a new integer-valued matrix $\overline{A}$ is an identity matrix, individual codeword decoding may be performed without regard to a combination of codewords. In the present example, an inverse conversion operation is unnecessary and thus the combination solver 490 may be omitted.

Figure 5:
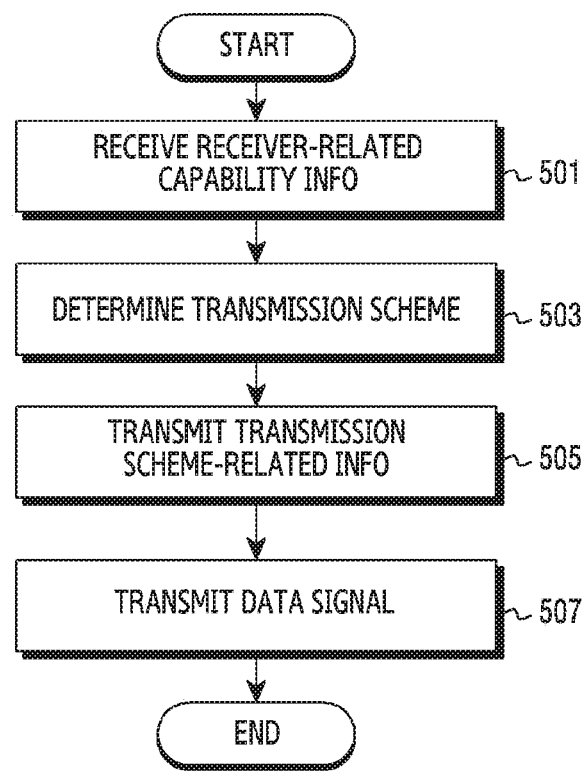
FIG. 5 illustrates a method for transmitting data by a transmitting node in a wireless communication system according to various embodiments of the present disclosure.

FIG. 5 illustrates a method for transmitting data by a transmitting node in a wireless communication system according to various embodiments of the present disclosure. FIG. 5 illustrates an example of an operating method of the transmitting node 110.

Referring to FIG. 5, in operation 501, the transmitting node receives, from a receiving node, receiver-related capability information of the receiving node. In the present example, a receiver includes at least some of hardware elements used until demodulation of an RF signal. Receiver-related capability information may include information necessary to determine whether the receiving node can use a particular reception algorithm. Also, receiver-related capability information may include information necessary to determine whether the transmitting node can use a particular transmission scheme. For example, capability information may include at least one of supportable coded modulation, supportable bit-to-symbol mapping, the number of supportable layers, the number of supportable modulation schemes, a supportable Transmission Mode (TM), and supportable MIMO reception algorithm. Supportable coded modulation may indicate at least one of BICM and MLC, and supportable bit-to-symbol mapping may indicate at least one of Gray mapping and natural mapping. Gray mapping and natural mapping will be described below with reference to FIGS. 7 and 8. A supportable MIMO reception algorithm may indicate at least one of ZF, MMSE, MMSE-SIC, IF decoding, and IF detection.

Then, in operation 503, the transmitting node determines a transmission scheme. The transmitting node may determine a transmission scheme based on receiver-related capability information. Further, the transmitting node determines a transmission scheme based on channel variability-related information in addition to receiver-related capability information. That is, some schemes among supportable transmission schemes may require predetermined capability of a receiver. Accordingly, when support for predetermined capability required by some schemes is checked through capability information, the transmitting node selects a transmission scheme to be used from among all the transmission schemes including the some schemes. In the present example, the transmitting node may select a transmission scheme including a signal processing rules which become a use condition of a reception algorithm which can be used by the receiving node and has been checked by the capability information. In contrast, when non-support for the predetermined capability required by the some schemes is checked through the capability information, the transmitting node selects a transmission scheme to be used from among the remaining transmission schemes except the some schemes.

Then, in operation 505, the transmitting node transmits transmission scheme-related information to the receiving node. That is, the transmitting node transmits, to the receiving node, information for notification of the selected transmission scheme. In the present example, information for notification of the selected transmission scheme may explicitly indicate a transmission scheme, or may implicitly indicate the selected transmission scheme so as to infer the selected transmission scheme. For example, transmission scheme-related information may include at least one of a coded modulation rule, a rule for bit-to-symbol mapping, a rule for mapping between a symbol and an antenna, a rule for resource mapping, a rule for resource allocation, and a rule for reference signal allocation. For example, transmission scheme-related information may be transmitted through at least one of a physical control channel (e.g., a Physical Downlink Control Channel (PDCCH)), higher layer (e.g., a Radio Resource Control (RRC) layer) signaling, and TM information.

Then, in operation 507, the transmitting node transmits a data signal. That is, the transmitting node generates a data signal by encoding and modulating data, and may transmit the data signal through multiple antennas. In the present example, the transmitting node generates a data signal according to the transmission scheme selected in operation 503.

Figure 6:
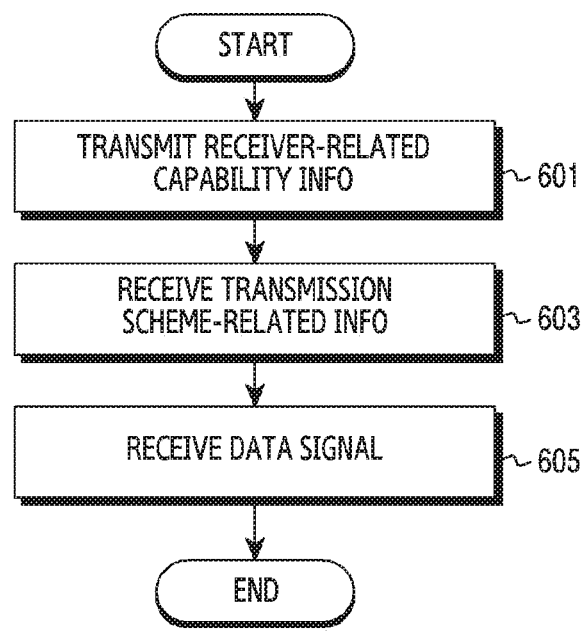
FIG. 6 illustrates a method for receiving data by a receiving node in a wireless communication system according to various embodiments of the present disclosure.

FIG. 6 illustrates a method for receiving data by a receiving node in a wireless communication system according to various embodiments of the present disclosure. FIG. 6 illustrates an example of an operating method of the receiving node 120.

Referring to FIG. 6, in operation 601, the receiving node transmits, to a transmitting node, receiver-related capability information of the receiving node. Receiver-related capability information may include information necessary to determine whether the receiving node can use a particular reception algorithm. Also, receiver-related capability information may include information necessary to determine whether the transmitting node can use a particular transmission scheme. For example, capability information may include at least one of supportable coded modulation, supportable bit-to-symbol mapping, the number of supportable layers, the number of supportable modulation schemes, a supportable TM, and a supportable MIMO reception algorithm. Supportable coded modulation may indicate at least one of BICM and MLC, and supportable bit-to-symbol mapping may indicate at least one of Gray mapping and natural mapping. Gray mapping and natural mapping will be described below with reference to FIGS. 7 and 8. A supportable MIMO reception algorithm may indicate at least one of ZF, MMSE, MMSE-SIC, IF decoding, and IF detection.

Then, in operation 603, the receiving node receives, from the transmitting node, transmission scheme-related information. That is, the receiving node receives, from the transmitting node, information for notification of a selected transmission scheme. In the present example, the information for notification of the selected transmission scheme may explicitly indicate a transmission scheme, or may indicate rules (e.g., a coded modulation rule and a rule for bit-to-symbol mapping) which allow inference of the selected transmission scheme. Transmission scheme-related information may be received together with resource allocation information. For example, transmission scheme-related information may be received together with at least one of a rule for mapping between a symbol and an antenna, a rule for resource allocation, and a rule for reference signal allocation. For example, transmission scheme-related information may be transmitted through at least one of a physical control channel (e.g., a PDCCH), higher layer (e.g., an RRC layer) signaling, and TM information.

Then, in operation 605, the receiving node receives a data signal. That is, the receiving node receives a data signal generated according to a transmission scheme indicated by the transmission scheme-related information received in operation 605. Accordingly, the receiving node processes the data signal in a reception algorithm corresponding to the transmission scheme indicated by the transmission scheme-related information.

In the embodiments described with reference to FIGS. 5 and 6, a rule for bit-to-symbol mapping may be variously defined. Bit-to-symbol mapping refers to mapping of an output bit of a channel encoder to a modulated symbol, and various embodiments consider rules for various bit-to-symbol mappings. For example, a rule for bit-to-symbol mapping may be one of Gray mapping and natural mapping. Hereinafter, Gray mapping will be described with reference to FIG. 7, and natural mapping will be described with reference to FIG. 8.

Figure 7:
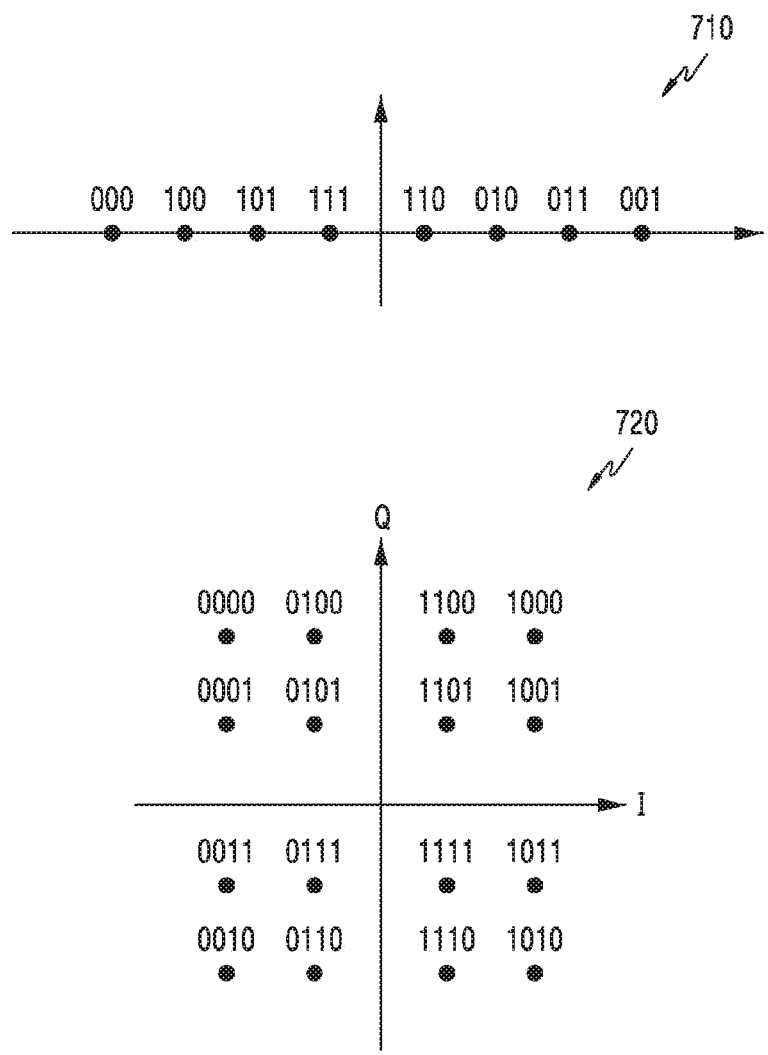
FIG. 7 illustrates an example of bit-to-symbol mapping in a wireless communication system according to various embodiments of the present disclosure.

FIG. 7 illustrates an example of bit-to-symbol mapping in a wireless communication system according to various embodiments of the present disclosure. Gray mapping is a method for performing mapping so as to minimize the number of different bits between bit strings mapped to two adjacent constellation points. Referring to FIG. 7, in the case of 8-Amplitude Shift Keying (ASK) 710, for eight symbols, a mapping rule is defined in the order of "000", "100", "101", "111", "110", "010", "011", and "001". Also, in the case of 16-Quadrature Amplitude Modulation (QAM) 720, for 16 symbols, a mapping rule is defined such that the number of different bits between adjacent constellation points becomes 1.

Figure 8:
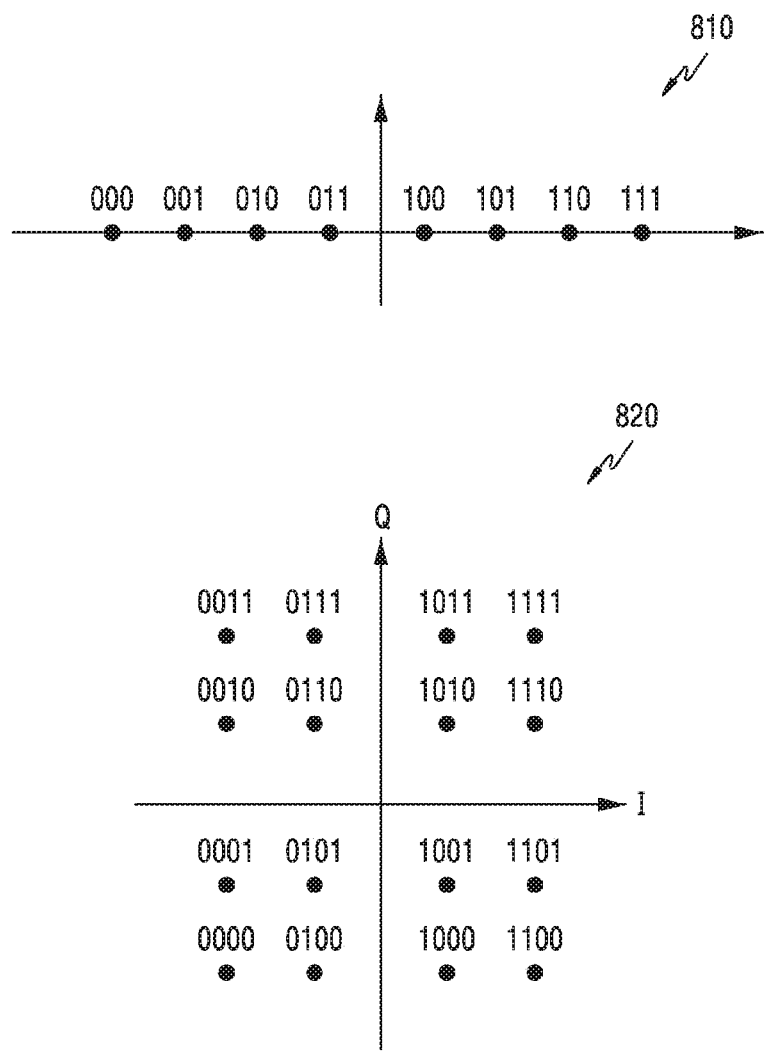
FIG. 8 illustrates another example of bit-to-symbol mapping in a wireless communication system according to various embodiments of the present disclosure.

FIG. 8 illustrates another example of bit-to-symbol mapping in a wireless communication system according to various embodiments of the present disclosure. Natural mapping is a method for performing mapping so that a decimal number (a digit) represented by bits is increased by one according to the order of constellation points. Referring to FIG. 8, in the case of 8-ASK 810, when a bit index is (b2, b1, b0), b2 is a Most Significant Bit (MSB), and b0 is a Least Significant Bit (LSB). Accordingly, for eight symbols, a mapping rule is defined in the order of "000", "001", "010", "011", "100", "101", "110", and "111". In the case of 16-QAM 820, when a bit index is (b3, b2, b1, b0), (b3, b2) corresponds to an in-phase (I) domain, (b1, b0) corresponds to a quadrature-phase (Q) domain, b3 and b1 is a MSB, and b2 and b0 is a LSB. Accordingly, in each domain, a mapping rule is defined in the order of "00", "01", "10", and "11". That is, natural mapping is a method for mapping a bit value and a constellation point so that a value represented by bits is increased by one according to the order of constellation points in the same domain. Natural mapping may be referred to as "sequential mapping" or "increasing mapping" according to a characteristic of natural mapping in which a bit value is sequentially increased.

In the embodiment of natural mapping described with reference to FIG. 8, (b3, b2) corresponds to an I domain, and (b1, b0) corresponds to a Q domain. However, a corresponding relationship of bits may be changed according to various embodiments. For example, (b3, b1) may correspond to an I domain, and (b2, b0) may correspond to a Q domain.

As described above, the transmitting node 110 supports various coded modulations (e.g., BICM and MLC) and various bit-to-symbol mappings (e.g., Gray mapping and natural mapping). For data transmission, the transmitting node 110 selects one coded modulation and one bit-to-symbol mapping. In the present example, the transmitting node 110 may adaptively select coded modulation and bit-to-symbol mapping according to the capability of the receiving node 120, a time/frequency channel change degree, the number of spatial layers, a modulation order (e.g., Quadrature Phase Shift Keying (QPSK), 16-QAM, 64-QAM, 256-QAM, and 1024-QAM), and the like. In this configuration, the number of spatial layers signifies the number of simultaneously-transmitted MIMO streams. Hereinafter, one embodiment of selecting a transmission scheme will be described.

Figure 9:
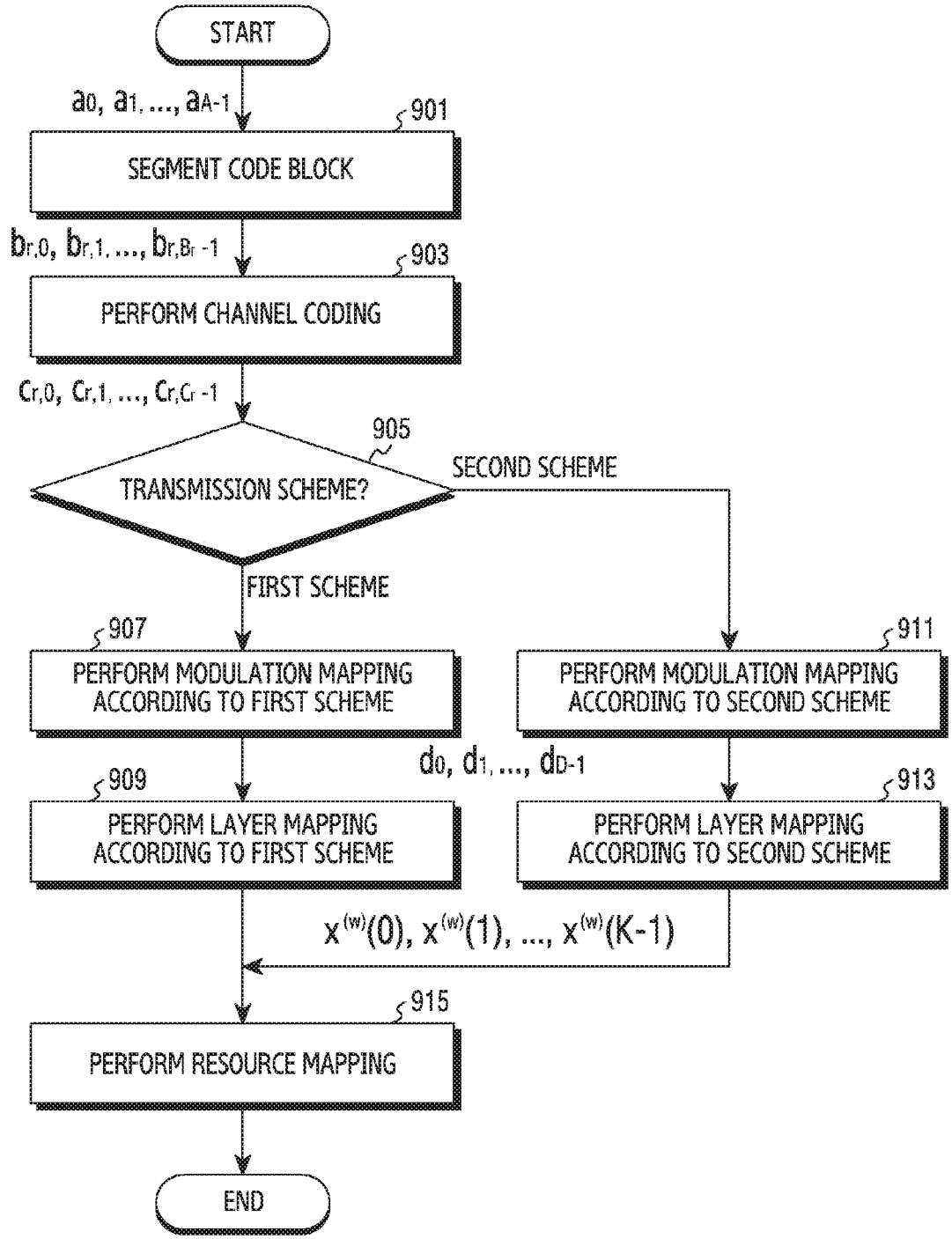
FIG. 9 illustrates a method for processing transmission data in a wireless communication system according to various embodiments of the present disclosure.

FIG. 9 illustrates a method for processing transmission data in a wireless communication system according to various embodiments of the present disclosure. FIG. 9 illustrates an example of an operating method of the transmitting node 110. In the embodiment of FIG. 9, a first scheme corresponds to a case in which BICM and Gray mapping, and a second scheme corresponds to a case in which MLC and natural mapping. In the embodiment of FIG. 9, a description is given of a case in which one transport block is transmitted. However, the embodiment of FIG. 9 may also be applied to a case in which multiple transport blocks are transmitted.

Referring to FIG. 9, in operation 901, the transmitting node performs code block segmentation. That is, the transmitting node segments a transmission bit sequence on a block-by-block basis, for channel coding. For example, the size of a transport block to be transmitted is A, information bit sequence may be expressed as $\{a_0, a_1, \ldots, a_{A-1}\}$. Through code block segmentation, a transport block may be segmented into R code blocks. Among the R code blocks, an r-th code block having a size of Br may be expressed as $\{b_{r,0}, b_{r,1}, \ldots, b_{r,Br-1}\}$. In the present example, R representing the number of code blocks and $B_1, B_2, \ldots, B_R$ representing sizes of respective code blocks may be determined differently according to a scheme selected from the first and second schemes.

Then, in operation 903, the transmitting node performs channel coding. Channel coding may be performed using a coding method defined according to system standards. For example, the transmitting node may perform channel coding by using one of a Low Density Parity Check (LDPC) code, a turbo code, and a polar code. For example, a bit sequence of an r-th encoded code block having a size of Cr may be expressed as $\{c_{r,0}, c_{0,1}, \ldots, c_{r,Cr-1}\}$. In the present example, a relationship of Br and Cr (e.g., the ratio of Br to Cr) may be changed according to a scheme selected from the first and second schemes. Although not illustrated in FIG. 9, the transmitting node may perform channel coding, and then may perform rate matching and code block concatenation.

Then, in operation 905, the transmitting node checks a transmission scheme. When a transmission scheme is the first scheme, the transmitting node proceeds to operation 907. When a transmission scheme is the second scheme, the transmitting node proceeds to operation 911.

In operation 907, the transmitting node performs modulation mapping according to the first scheme. Since the first scheme includes BICM, the transmitting node maps, to a modulated symbols, bits consecutive in an encoded code block. For example, when M bits are mapped to one modulated symbol, the transmitting node maps $c_{0,0}, c_{0,1}, \ldots, c_{0,M-1}$ to a first modulated symbol $d_0$, and maps $c_{0,M}, c_{0,M+1}, \ldots, c_{0,2M-1}$ to a second modulated symbol $d_1$. In the present example, bit-to-symbol mapping is performed according to Gray mapping.

Then, in operation 909, the transmitting node performs layer mapping according to the first scheme. Layer mapping is a procedure for mapping modulated symbols to each antenna, and may be performed using a different method according to the number of antennas. For example, when the number of modulated symbols is D, a modulated symbol sequence after modulation mapping may be expressed as $\{d_0, d_1, \ldots, d_{D-1}\}$. According to the first scheme, layer mapping may be performed using Equation 1 below.

$$x^{(0)}(i) = d(Wi)$$
$$x^{(1)}(i) = d(Wi+1)$$
$$\vdots$$
$$x^{(W-1)}(i) = d(Wi+W-1)$$

Equation 1

In Equation 1, $x^{(a)}(i)$ signifies an i-th modulated symbol of an antenna having an index a, d(a) signifies a modulated symbol having an index a, and W signifies the number of antennas. In Equation 1, i is 1, ..., K and K is the number of modulated symbols transmitted per antennas. Also, a relationship of K×W=D is established.

In operation 911, the transmitting node performs modulation mapping according to the second scheme. Since the second scheme includes MLC, the transmitting node extracts one bit from each of multiple encoded code blocks, and maps the extracted bits to one modulated symbol. For example, when M bits are mapped to one modulated symbol, the transmitting node maps $c_{0,0}, c_{1,0}, \ldots, c_{M-1,0}$ to a first modulated symbol $d_0$, and maps $c_{0,1}, c_{1,1}, \ldots, c_{M-1,1}$ to a second modulated symbol $d_1$. In the present example, bit-to-symbol mapping is performed according to natural mapping. When R representing the number of encoded code blocks is larger than M, the transmitting node repeats mapping with respect to an (M+1)-th encoded code block to a 2M-th encoded code block in the same method.

In operation 913, the transmitting node performs layer mapping according to the second scheme. Layer mapping is a procedure for mapping modulated symbols to each antenna, and may be performed in a different method according the number of antennas. For example, when the number of modulated symbols is D, a modulated symbol sequence after modulation mapping may be expressed as $\{d_0, d_1, \ldots, d_{D-1}\}$. In the present example, according to the second scheme, layer mapping may be performed using Equation 2 below.

$$x^{(0)}(i) = d(i)$$
$$x^{(1)}(i) = d(C+i)$$
$$\vdots$$
$$x^{(W-1)}(i) = d((W-1)C+i)$$

Equation 2

In Equation 2, x(a)(i) signifies an i-th modulated symbol of an antenna having an index a, d(a) signifies a modulated symbol having an index a, C signifies the number of modulated symbols per encoded code block, and W signifies the number of antennas. In Equation 2, i is 1, ..., K and K is the number of modulated symbols transmitted per antenna. Also, a relationship of K×W=D and C=K is established.

After antenna mapping is performed according to the first or second scheme, in operation 915, the transmitting node performs resource mapping. Resource mapping is a procedure for mapping modulated symbols to time-frequency resources, and may be performed by considering a channel environment. That is, the transmitting node may select a rule for resource mapping based on information on a channel environment measured by the receiving node or the transmitting node, and may map modulated symbol to a resource (e.g., a Resource Block (RB) or a Resource Element (RE)).

In the embodiment described with reference to FIG. 9, the transmitting node performs layer mapping, and then performs resource mapping. In the present example, although not illustrated in FIG. 9, the transmitting node may perform layer mapping, and then may perform precoding.

Figure 10:
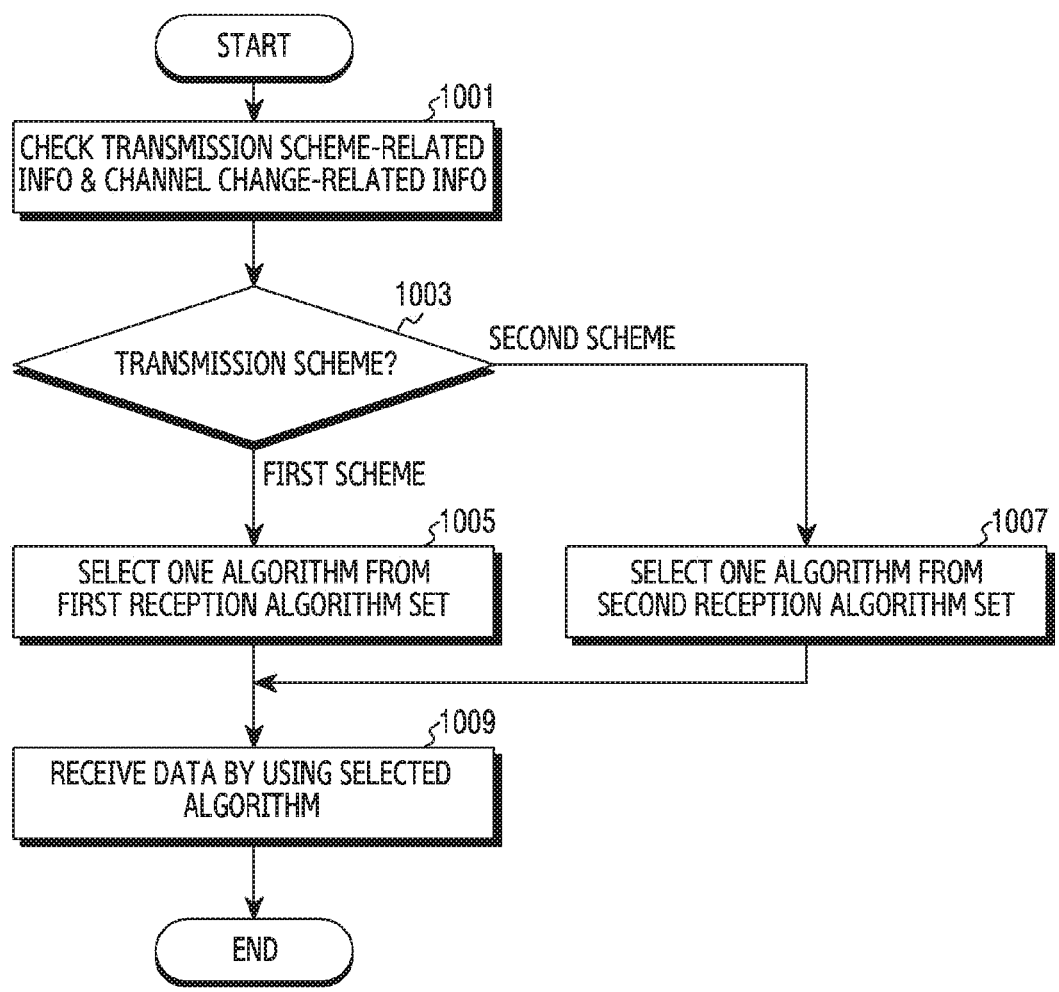
FIG. 10 illustrates a method for processing received data in a wireless communication system according to various embodiments of the present disclosure.

FIG. 10 illustrates a method for processing received data in a wireless communication system according to various embodiments of the present disclosure. FIG. 10 illustrates an example of an operating method of the receiving node 120. In the embodiment of FIG. 10, a first scheme corresponds to a case in which BICM and Gray mapping, and a second scheme corresponds to a case in which MLC and natural mapping.

Referring to FIG. 10, in operation 1001, the receiving node checks transmission scheme-related information and channel change-related information. Transmission scheme-related information may be checked based on control information received from a transmitting node. Channel change-related information may be determined based on measurement of a signal received from the transmitting node. For example, transmission scheme-related information includes at least one of a coded modulation rule, a rule for bit-to-symbol mapping, the number of spatial layers, and a modulation order. Channel change-related information may include at least one of a time-axis channel variation, a frequency-axis channel variation, and information indicating an axis on which a channel variation is larger.

In operation 1003, the receiving node checks a transmission scheme used by the transmitting node. The receiving node may check a transmission scheme based on the transmission scheme-related information checked in operation 1001. When a transmission scheme is the first scheme, the receiving node proceeds to operation 1005. When a transmission scheme is the second scheme, the receiving node proceeds to operation 1007.

In operation 1005, the receiving node selects one reception algorithm from a first reception algorithm set corresponding to the first scheme. For example, the first reception algorithm set may include ZF, MMSE, and MMSE-SIC. In the present example, the receiving node may select a reception algorithm based on at least one of a rule for bit-to-symbol mapping, the number of spatial layers, a modulation order, a time-axis channel variation, a frequency-axis channel variation, and an axis on which a channel variation is larger. In the present example, a criterion for selection of a reception algorithm is performance maximization.

In operation 1007, the receiving node selects one reception algorithm from a second reception algorithm set corresponding to the second scheme. For example, the second reception algorithm set may include ZF, MMSE, MMSE-SIC, IF decoding, and IF detection. That is, when the transmitting node uses MLC and natural mapping, the receiving node may use an IF decoding/detection algorithm. That is, the use of MLC and natural mapping by the transmitting node may become a condition for use of an IF decoding/detection algorithm. In the present example, the receiving node may select a reception algorithm based on at least one of a rule for bit-to-symbol mapping, the number of spatial layers, a modulation order, a time-axis channel variation, a frequency-axis channel variation, and an axis on which a channel variation is larger. In the present example, a criterion for selection of a reception algorithm may be performance maximization. Typically, when a channel variation is small, IF decoding has performance better than that of IF detection. Also, IF detection has a characteristic which is more robust against a channel change. Accordingly, when a channel variation is smaller than or equal to a threshold, the receiving node may select IF decoding. As another example, when a channel variation exceeds the threshold, the receiving node may select IF detection.

In operation 1009, the receiving node receives data by using the selected reception algorithm. That is, the receiving node receives a data signal, and processes the data signal according to the selected reception algorithm. For example, when IF decoding or IF detection is selected, the receiving node may process a data signal by using an equalization matrix. Then, according to the checked transmission scheme of the transmitting node, the receiving node converts a modulated symbol into a bit sequence and reconstructs a transport block.

As in the embodiments described with reference to FIGS. 9 and 10, a data processing procedure of each of the transmitting node 110 and the receiving node 120 may be appropriately selected according to a selected transmission scheme. The above-described data processing procedure is mainly related to a coded modulation rule, a rule for bit-to-symbol mapping, an antenna mapping rule, and the like. Further, a resource mapping rule and a reference signal allocation rule are appropriately selected in consideration of a channel change.

Figure 11:
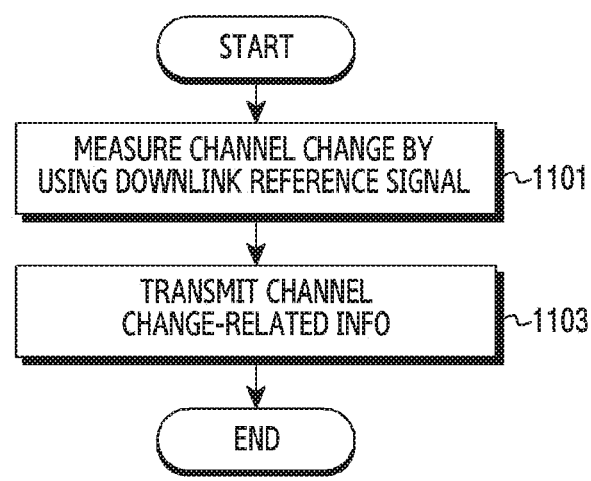
FIG. 11 illustrates a method for transmitting information on a channel change by a receiving node in a wireless communication system according to various embodiments of the present disclosure.

FIG. 11 illustrates a method for transmitting information on a channel change by a receiving node in a wireless communication system according to various embodiments of the present disclosure. FIG. 10 illustrates an example of an operating method of the receiving node 120.

Referring to FIG. 11, in operation 1101, the receiving node measures a channel change by using a reference signal. A channel change may be measured as a change on the time axis and a change on the frequency axis. For example, the receiving node may determine a channel change on the time axis by measuring at least one of a movement speed, a Doppler frequency, and a statistical value (e.g., a variance or a standard deviation) of channel information on the time axis. Also, the receiving node may determine a channel change on the frequency axis by measuring at least one of delay spread and a statistical value (e.g., a variance or a standard deviation) of channel information on the frequency axis.

Then, in operation 1103, the receiving node transmits channel change-related information to the transmitting node. Channel change-related information includes at least one of a time-axis channel variation, a frequency-axis channel variation, relative magnitudes of time axis and frequency-axis channel changes, and a channel change degree. A time-axis channel variation may represent an average speed and a Doppler frequency, and a frequency-axis channel variation may represent the amount of delay spread. A channel variation may be expressed as a value expressed as a level (e.g., 0, 1, 2, or 3). In the present example, "0" represents a state in which there is no or very small channel change, and "3" represents a state in which a channel change is very large. Relative magnitudes of time axis and frequency-axis channel changes represent whether a time-axis channel change is larger than a frequency-axis channel change or a frequency-axis channel change is larger than a time-axis channel change. A channel change degree represents at least one of whether a time-axis channel variation is larger than a first threshold, whether a frequency-axis channel variation is larger than a second threshold, whether a time-axis channel variation is larger than the first threshold or a frequency channel variation is larger than the second threshold T2, and whether a time-axis channel variation is larger than the first threshold and a frequency channel variation is larger than the second threshold.

Figure 12:
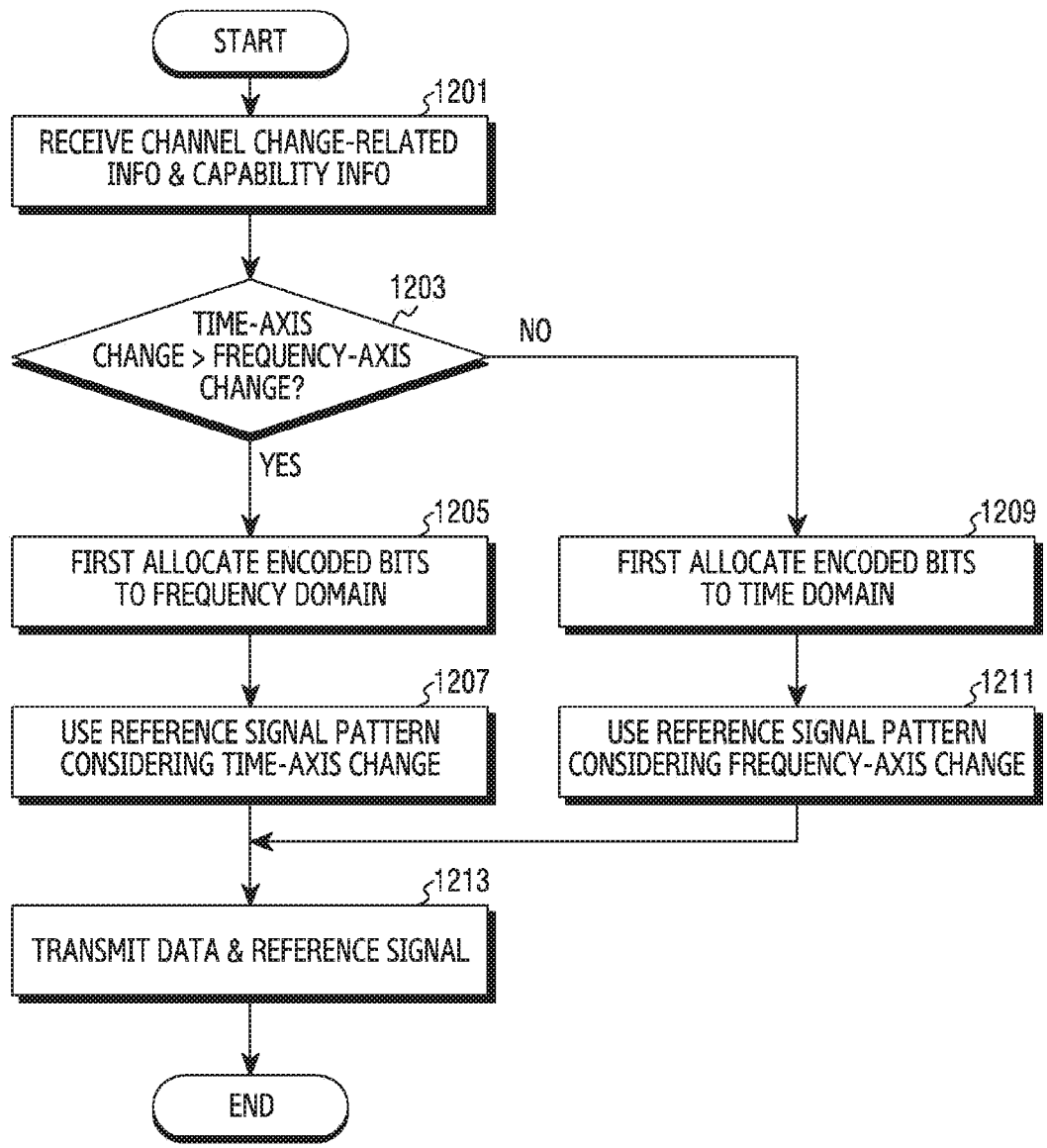
FIG. 12 illustrates a method for processing data by considering a channel change in a wireless communication system according to various embodiments of the present disclosure.

FIG. 12 illustrates a method for processing data by considering a channel change in a wireless communication system according to various embodiments of the present disclosure. FIG. 12 illustrates an example of an operating method of the transmitting node 110.

Referring to FIG. 12, in operation 1201, the transmitting node receives channel change-related information and capability information. In the present example, channel change-related information includes at least one of a time-axis channel variation, a frequency-axis channel variation, relative magnitudes of time-axis and frequency-axis channel changes, and a channel change degree. According to another embodiment, instead of receiving channel change-related information from the receiving node, the transmitting node may measure a channel change based on a reference signal (e.g., a sounding signal) transmitted by the receiving node.

Then, in operation 1203, the transmitting node compares a time-axis channel change with a frequency-axis channel change. When a time-axis channel change is larger than a frequency-axis channel change, the transmitting node proceeds to operation 1205. When a frequency-axis channel change is larger than a time-axis channel change, the transmitting node proceeds to operation 1209.

Figure 13:
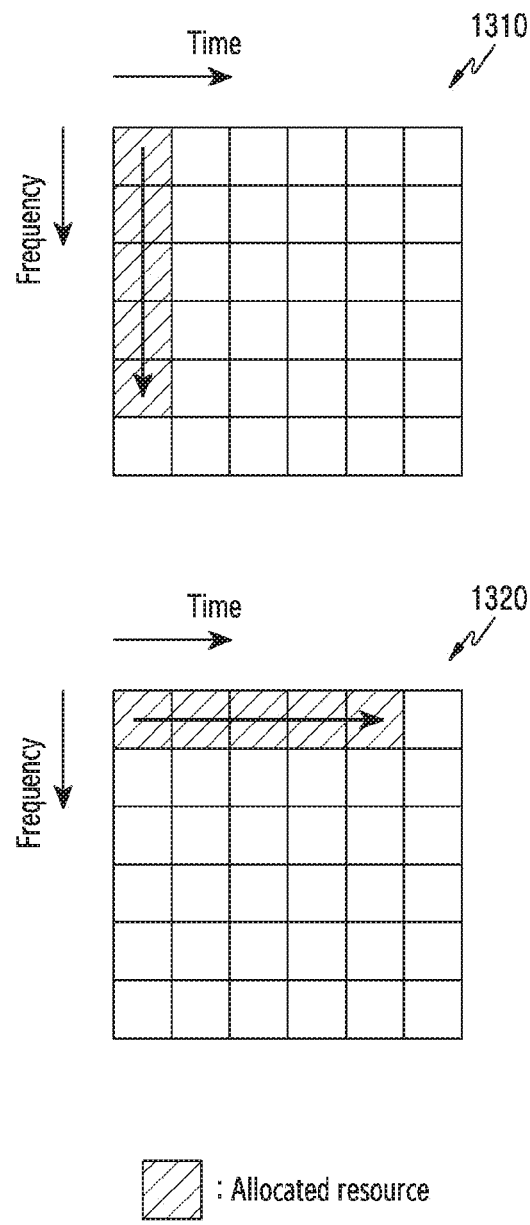
FIG. 13 illustrates examples of resource mapping in a wireless communication system according to various embodiments of the present disclosure.

In operation 1205, the transmitting node first allocates encoded bits to a frequency domain. Although not illustrated in FIG. 12, modulated symbols are generated by channel coding and modulation. Thereafter, according to a frequency-first resource mapping rule, the transmitting node allocates modulated symbols as increasing an index of a frequency resource, and then allocates modulated symbols as increasing an index of a time resource. As illustrated in FIG. 13, frequency-first mapping 1310 is a method for first allocating resources along the frequency axis. For example, (k, l) represents an RE index of frequency/time resources on which a signal is transmitted, wherein k represents an index of a frequency resource (k=0, 1, . . . , K) and l represents an index of a time resource (l=0, 1, . . . , L). When l=0, the transmitting node maps K modulated symbols. Then, the transmitting node increases l by one and maps the next K modulated symbols. In other words, the transmitting node selects resources, on which modulated symbols are to be transmitted, in the order of (0,0), (1,0), (2,0), . . . , (K,0), (0,1), . . . . In the present example, the transmitting node may allocate modulated symbols to REs except an RE for mapping of a reference signal.

Figure 14:
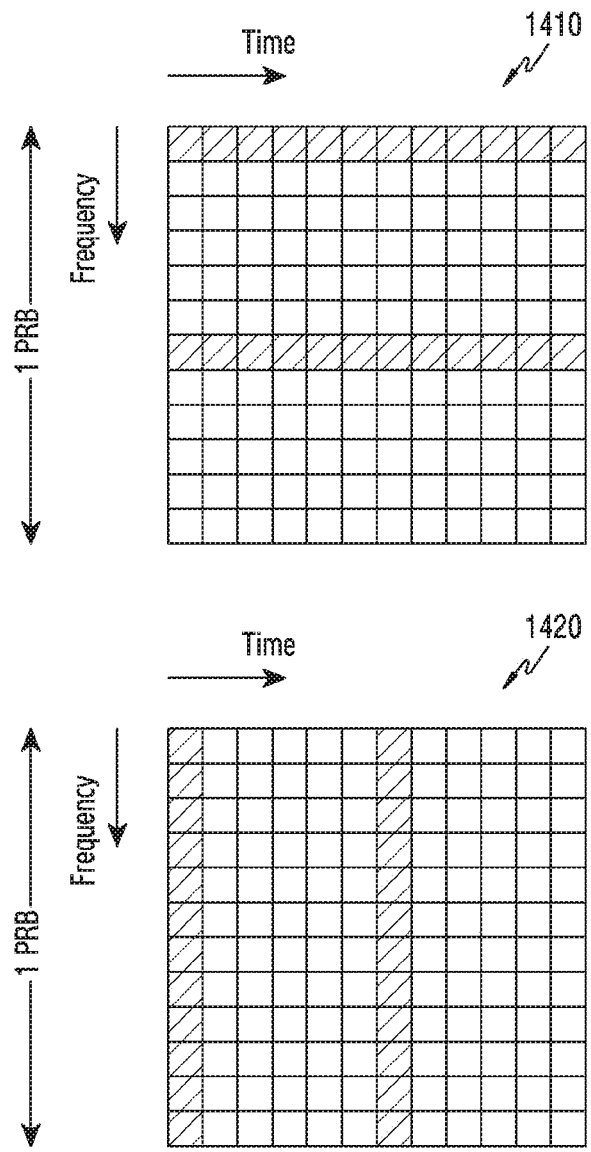
FIG. 14 illustrates examples of allocating a reference signal in a wireless communication system according to various embodiments of the present disclosure.

Then, in operation 1207, the transmitting node uses a reference signal pattern which considers a time axis change. Since a channel change on the time axis is relatively large, in order to more accurately estimate a channel on the time axis, the transmitting node may map reference signals according to a reference signal pattern which is widely spread along the time axis. Specifically, reference signals may be spread so that an interval between adjacent reference signals on the time axis is shorter than an interval between adjacent reference signals on the frequency axis. For example, as illustrated in FIG. 14, reference signals may be continuously allocated on the time axis, according to a time-reference signal allocation pattern 1410 within one Physical RB (PRB). FIG. 14 illustrates an example in which reference signals are allocated to all the REs on the time axis. However, according to another embodiment, REs may be spaced at a predetermined interval.

In operation 1209, the transmitting node first allocates encoded bits to a time domain. Although not illustrated in FIG. 12, modulated symbols are generated by channel coding and modulation. Thereafter, according to a time-first resource mapping rule, the transmitting node allocates modulated symbols as increasing an index of a time resource, and then allocates modulated symbols as increasing an index of a frequency resource. As illustrated in FIG. 13, time-first mapping 1320 is a method for first allocating resources along the time axis. For example, (k, l) represents an RE index of frequency/time resources on which a signal is transmitted, wherein k represents an index of a frequency resource (k=0, 1, . . . , K) and l represents an index of a time resource (l=0, 1, . . . , L). When k=0, the transmitting node maps L modulated symbols. Then, the transmitting node increases k by one and maps the next L modulated symbols. In other words, the transmitting node selects resources, on which modulated symbols are to be transmitted, in the order of (0,0), (0,1), (0,2), . . . , (0,L), (1,0), . . . . In the present example, the transmitting node may allocate modulated symbols to REs except an RE for mapping of a reference signal.

Then, in operation 1211, the transmitting node uses a reference signal pattern which considers a frequency axis change. Since a channel change on the frequency axis is relatively large, in order to more accurately estimate a channel on the frequency axis, the transmitting node may map reference signals according to a reference signal pattern which is widely spread along the frequency axis. Specifically, reference signals may be spread so that an interval between adjacent reference signals on the frequency axis is shorter than an interval between adjacent reference signals on the time axis. For example, as illustrated in FIG. 14, reference signals may be continuously allocated on the frequency axis, according to a frequency-reference signal allocation pattern 1420 within one PRB. FIG. 14 illustrates an example in which reference signals are allocated to all the REs on the frequency axis. However, according to another embodiment, REs may be spaced at a predetermined interval.

After modulated symbols and reference signals are mapped, in operation 1213, the transmitting node transmits data and reference signals. For example, when the transmitting node complies with an Orthogonal Frequency Division Multiplexing (OFDM) scheme, the transmitting node generates OFDM symbols through Inverse Fast Fourier Transform (IFFT) and addition of a cyclic Prefix (CP), and transmits the OFDM symbols.

In the embodiment described with reference to FIG. 12, the transmitting node uses one of time-reference signal allocation 1410 and frequency-reference signal allocation 1410 along an axis on which a channel change is larger. However, according to another embodiment, scattered-reference signal allocation may be further applied. Scattered-reference signal allocation is a mapping method for scattering reference signals on the time axis and frequency axis. In the present example, a resolution of a reference signal on the time axis may be identical to or different from that of a reference signal on the frequency axis. Scattered-reference signal allocation may be used when a time-axis channel variation is identical or similar to a frequency-axis channel variation. In the present example, the similarity between channel variations may be determined according to various criteria. Alternatively, when it is impossible to determine an axis on which a channel change is larger, the transmitting node may use scattered-reference signal allocation.

As described above, it is possible to use at least two reference signal allocation rules among time-reference signal allocation 1410, frequency-reference signal allocation 1410, and scattered-reference signal allocation. In the present example, when the reference signal allocation rules differ from each other with respect to the number of used reference signals, the number of modulated symbols transmissible per unit resource (e.g., RB) depends on selection of a reference signal allocation rule. In the present example, the transmitting node needs to select different channel coding, according to selection of a reference signal allocation rule. Therefore, according to an embodiment, in order to prevent selection of different channel coding according to selection of a reference signal allocation rule, the reference signal allocation rules need to be restricted to have the same number of reference signals used therein.

In the embodiment described with reference to FIG. 12, the resource mapping rules define resource mapping in an RE unit. However, according to another embodiment, it is possible to apply a rule for resource mapping in an RB unit, instead of or in addition to resource mapping in an RE unit. An RB is a set of REs and may include, for example, a (T×F) number of REs including T time resources and F frequency resources. Similarly to resource mapping in an RE unit, when a channel change on the time axis is larger, a frequency-first RB allocation rule may be used. When a channel change on the frequency axis is larger, a time-first RB allocation rule may be used. Frequency-first RB allocation is a method for first allocating an RB along the frequency axis during allocation of an RB to be used for signal transmission. Time-first RB allocation is a method for first allocating an RB along the time axis during allocation of an RB to be used for signal transmission.

When time-first RB allocation is used, resources may be allocated over multiple transmission time intervals (e.g., subframes). However, when the system supports Hybrid Automatic Repeat reQuest (HARQ), an allowed time difference between a signal reception time point of the receiving node and a feedback time point of ACKnowledge (ACK)/Non-ACK (NACK) thereof may be shorter than multiple transmission time intervals. In the present example, time-first RB allocation precludes compliance with a time difference allowed for ACK/NACK feedback. Accordingly, when a time difference allowed by the system exceeds a threshold, use of time-first RB allocation may be limited.

According to the above-described embodiments, when an RE and an RB are allocated, if a channel change on the time axis is larger, a frequency-first allocation rule is used. If a channel change on the frequency axis is larger, a time-first allocation rule is used. However, according to another embodiment, in order for the receiving node to increase a diversity effect due to a channel change, it is possible to differently define a corresponding relationship between an axis on which a channel change is shown to be larger and an axis on which allocation is first performed. That is, in said another embodiment, when a time-axis channel change is larger, a time-first allocation rule may be used, and when a frequency-axis channel change is larger, a frequency-first allocation rule may be used.

In the above-described embodiments, a resource mapping rule and a reference signal allocation rule are selected according to an axis on which a channel change is larger. However, according to another embodiment, at least one of a resource mapping rule and a reference signal allocation rule may be adaptively selected by further considering at least one of the capability of a receiving node, the number of spatial layers, and a modulation order.

Figure 15:
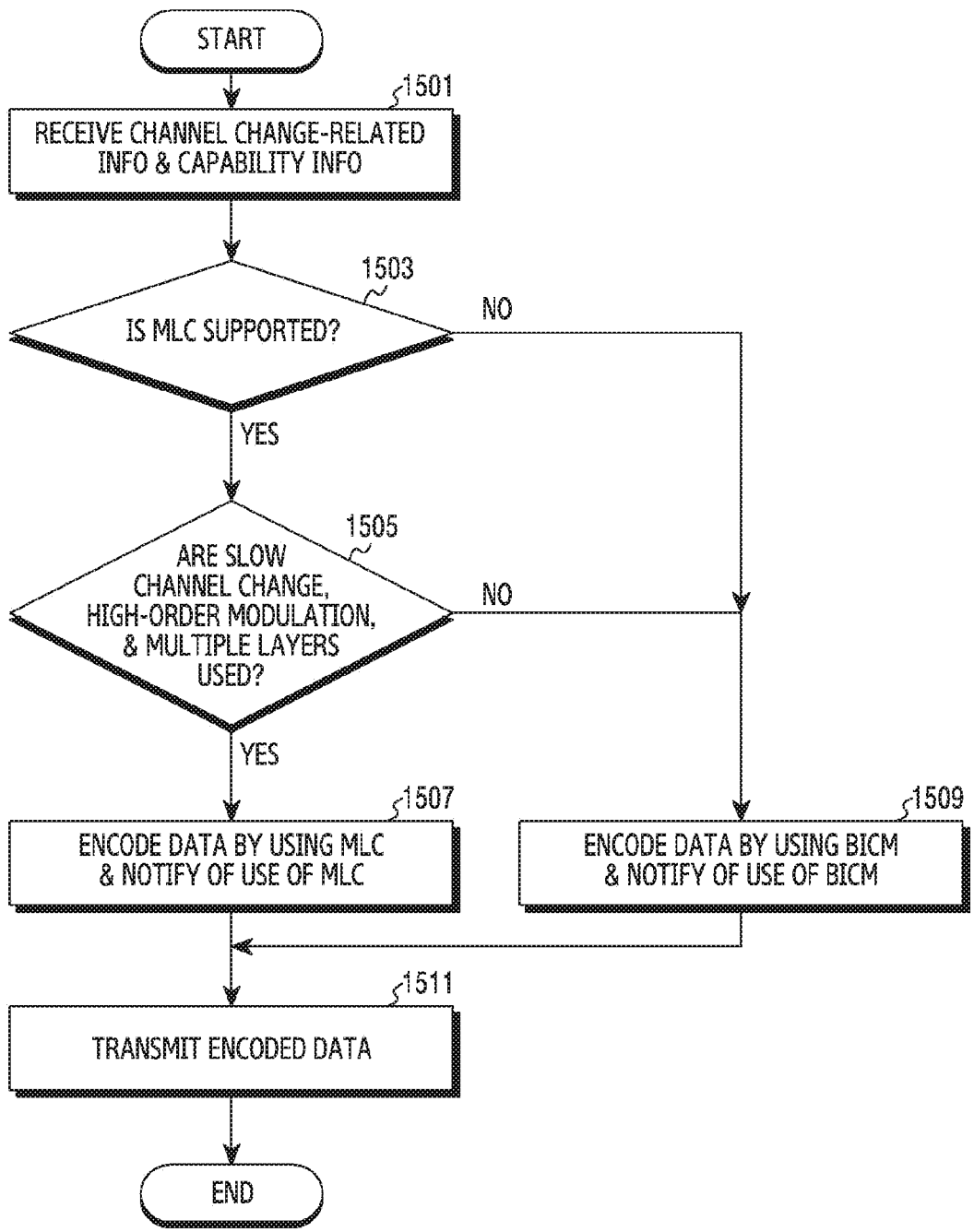
FIG. 15 illustrates a method for transmitting data and control information by a transmitting node in a wireless communication system according to various embodiments of the present disclosure.

FIG. 15 illustrates a method for transmitting data and control information by a transmitting node in a wireless communication system according to various embodiments of the present disclosure. FIG. 15 illustrates an example of an operating method of the transmitting node 110.

Referring to FIG. 15, in operation 1501, the transmitting node receives channel change-related information and capability information. In the present example, channel change-related information includes at least one of time-axis channel variation, frequency-axis channel variation, relative magnitudes of time-axis and frequency-axis channel changes, and a channel change degree. Also, capability information may include at least one of supportable coded modulation, supportable bit-to-symbol mapping, the number of supportable layers, the number of supportable modulation schemes, a supportable TM, and supportable MIMO reception algorithm.

Then, in operation 1503, the transmitting node checks whether a receiving node supports MLC. The transmitting node may check whether a receiving node supports MLC, based on information on supportable coded modulation included in the capability information. When the receiving node does not support MLC, the transmitting node proceeds to operation 1509.

In contrast, when the receiving node supports MLC, in operation 1505, the transmitting node checks a condition for a channel change, a condition for a modulation order, and a condition for the number of spatial layers. That is, the transmitting node determines whether receiver capability of the receiving node satisfies a pre-defined condition for a channel change, a pre-defined condition for a modulation order, and a pre-defined condition for the number of spatial layers. Specifically, the transmitting node determines whether a channel change is lower than a critical level, whether a modulation order is larger than or equal to a critical order, and whether the number of spatial layers is larger than or equal to a threshold. For example, a critical order relative to a modulation order may be 16-QAM, and a threshold for the number of spatial layers may be 4 or 3. As another example, a critical order relative to a modulation order is 16-QAM while the number of spatial layers is 4, or a critical order relative to a modulation order is 4-QAM while the number of spatial layers is 5 or more. It is possible to consider only one condition or a combination of at least two conditions among the condition for a channel change, the pre-defined condition for a modulation order, and the pre-defined condition for the number of spatial layers.

When: a channel change is lower than the critical level; a modulation order is higher than or equal to a threshold; and the number of spatial layers is larger than or equal to a threshold, in operation 1507, the transmitting node encodes data by using MLC. In the present example, the transmitting node may use natural mapping as a rule for bit-to-symbol mapping. Then, the transmitting node notifies the receiving node of the use of MLC. That is, the transmitting node transmits control information notifying of the use of MLC. In the present example, control information may be transmitted through at least one of a physical control channel (e.g., a PDCCH), higher layer (e.g., an RRC layer) signaling, and TM information.

In contrast, when: a channel change is higher than or equal to the critical level; a modulation order is lower than a threshold; or the number of spatial layers is smaller than a threshold, in operation 1509, the transmitting node encodes data by using BICM. In the present example, the transmitting node may use Gray mapping as a rule for bit-to-symbol mapping. Then, the transmitting node notifies the receiving node of the use of BICM. That is, the transmitting node transmits control information notifying of the use of BICM. In the present example, control information may be transmitted through at least one of a physical control channel (e.g., a PDCCH), higher layer (e.g., an RRC layer) signaling, and TM information.

Then, in operation 1511, the transmitting node transmits the encoded data. In the present example, although not illustrated in FIG. 15, the transmitting node may further determine a resource mapping rule and an antenna mapping rule, and may apply the determined mapping rules.

In the embodiment described with reference to FIG. 15, when: a channel change is lower than the critical level; a modulation order is higher than or equal to a threshold; and the number of spatial layers is larger than or equal to a threshold, MLC is used. This configuration corresponds to an example defined by considering a condition in which the performance of IF decoding or IF detection can be ensured to be higher than or equal to a predetermined level. That is, typically, when a transmitting node uses MLC and natural mapping, the larger the number of spatial layers and the higher a modulation order, the better performance IF decoding/detection has. Also, typically, when a transmitting node uses MLC and natural mapping: as a variation of a channel through which a code block is delivered becomes smaller, the performance of IF decoding is shown to be better than that of IF detection; and as the variation of the channel through which a code block is delivered becomes larger, the performance of IF detection is shown to be better than that of IF decoding. However, when a special channel status or a special restriction further exists, detailed contents of the operation (indicated by reference numeral 1505) of determining a condition for use of MLC may vary according to various embodiments. For example, the embodiment described with reference to FIG. 15 may be modified as follows.

According to an embodiment, a receiving node notifies of non-support for MLC and natural mapping, through capability information. In the present example, a transmitting node may perform MIMO transmission by using BICM and Gray mapping.

According to another embodiment, a receiving node notifies of support for MLC and natural mapping, through capability information. Accordingly, a transmitting node determines that the receiving node can use an IF reception algorithm (e.g., IF decoding or IF detection), and may select signal processing rules which become a condition for use of an IF reception algorithm. For example, signal processing rules, which become a condition for use of an IF reception algorithm, may be MLC and natural mapping. That is, the transmitting node may select a transmission scheme including MLC and natural mapping which become a condition for use of an IF reception algorithm which can be used by the reception node and has been checked by the capability information.

According to still another embodiment, a receiving node notifies, through capability information, that the receiving node supports MLC and natural mapping but does not support an IF reception algorithm (e.g., IF decoding or IF detection). In the present example, a transmitting node may perform MIMO transmission by using BICM and Gray mapping.

According to yet another embodiment, a receiving node notifies, through capability information, that the receiving node supports MLC and natural mapping and supports an IF reception algorithm. Then, the receiving node reports the maximum number of supportable spatial layers and a maximum supportable modulation order, through capability information. In the present example, when the maximum number of spatial layers supportable by the receiving node is smaller than or equal to 2, a transmitting node may perform MIMO transmission by using BICM and Gray mapping. Alternatively, when a maximum modulation order supportable by the receiving node is 4 (e.g., 4-QAM), the transmitting node may perform MIMO transmission by using BICM and Gray mapping. Alternatively, when the maximum number of spatial layers supportable by the receiving node is larger than or equal to 4 and a maximum modulation order supportable by the receiving node is 16 (e.g., 16-QAM), the transmitting node may perform MIMO transmission by using MLC and natural mapping.

According to the above-described various embodiments, the transmitting node 110 determines a transmission scheme based on capability information and channel information which have been received from the receiving node 120. That is, the transmitting node 110 selects an optimal transmission scheme by considering receiver-related capability information of the receiving node 120 and channel information.

However, according to another embodiment, the receiving node 120 may request the transmitting node 110 for a transmission scheme preferred by the receiving node 120. In the present example, separately from capability information, the receiving node 120 may transmit control information for notification of a preferred transmission scheme. For example, control information may include at least one of a coded modulation rule, a rule for a bit-to-symbol mapping, an RE mapping rule, an RB allocation rule, and a reference signal allocation rule.

According to an embodiment, control information for notification of a preferred transmission scheme may be transmitted together with Channel State Information (CSI) information. Specifically, when the receiving node 120 notifies, through CSI information, of a rank supportable by the receiving node 120 with respect to a current channel, the receiving node 120 may transmit CSI information together with control information for notification of a preferred transmission scheme. A rank supportable with respect to a current channel is dynamic information changeable according to a channel status, and differs from receiver-related capability information. For example, when a supportable rank is lower than or equal to 3, the receiving node 120 transmits a rank without control information for notification of a preferred transmission scheme. In contrast, when a supportable rank is higher than or equal to 4, the receiving node 120 transmits a rank and control information for notification of a preferred transmission scheme.

In the above-described various embodiments, transmission scheme-related information may be delivered from the transmitting node 110 to the receiving node 120 in various forms.

According to an embodiment, transmission scheme-related information may be delivered through a physical control channel (e.g., a PDCCH). Specifically, transmission scheme-related information may be delivered in the form of Downlink Control Information (DCI) including control information on downlink transmission, uplink transmission, or sidelink transmission. In the present example, DCI may include at least one of the fields listed in Table 1 below.

TABLE 1

| Field | Size | Description |
|---|---|---|
| Coded modulation type | 1 bit | "0" indicates BICM, and "1" indicates MLC |
| Bit-to-symbol mapping method | 1 bit | "0" indicates Gray mapping, and "1" indicates natural mapping |
| Coded modulation and bit-to-symbol mapping method | 1 bit | "0" indicates BICM and Gray mapping, and "1" indicates MLC and natural mapping |
| RE mapping | 1 bit | "0" indicates frequency-first RE mapping, and "1" indicates time-first RE mapping |
| RB assignment | changeable | indicates RBs selected from set of candidate RBs |

TABLE 1-continued

| Field | Size | Description |
| --- | --- | --- |
| RB allocation | 1 bit | "0" indicates frequency-first RB allocation, and "1" indicates time-first RB allocation. When relevant field is "0", candidate RBs are considered on frequency axis in relation to RB assignment, and when relevant field is "1", candidate RBs are considered on time axis in relation to RB assignment. |
| RS allocation | 1 bit | "0" indicates time-reference signal allocation, and "1" indicates frequency-reference signal allocation. |
| RE mapping and RS allocation | 1 bit | "0" indicates frequency-first RE mapping and time-reference signal allocation, and "1" indicates time-first RE mapping and frequency-reference signal allocation |
| RB allocation and RS allocation | 1 bit | "0" indicates frequency-first RB allocation and time-reference signal allocation, and "1" indicates time-first RB allocation and frequency-reference signal allocation |
| RE mapping and RB allocation | 1 bit | "0" indicates frequency-first RE mapping and frequency-first RB allocation, and "1" indicates time-first RE mapping and time-first RB allocation |
| RE mapping, RS allocation, and RB allocation | 1 bit | "0" indicates frequency-first RE mapping, time-reference signal allocation, and frequency-first RB allocation; "1" indicates time-first RE mapping, frequency-reference signal allocation, and time-first RB allocation |

DCI may include at least one of the fields listed in Table 1. For example, a format of DCI may be configured as in Table 2 below or Table 3 below.

TABLE 2

Downlink Control Information (DCI)

Coded modulation and bit-to-symbol mapping method (1 bit)
RB allocation (1 bit)

TABLE 3

Downlink Control Information (DCI)

Coded modulation (1 bit)
Bit-to-symbol mapping method (1 bit)
RE mapping, RS allocation, and RB allocation (1 bit)

According to another embodiment, transmission scheme-related information may be delivered through higher layer (e.g., an RRC layer) signaling. Specifically, transmission scheme-related information may be delivered through system information or an RRC configuration message.

When transmission scheme-related information is delivered through system information, the system information may include at least one of the fields includable in DCI listed in Table 1. System information may be transmitted through a separate physical channel (e.g., a Physical Broadcast Channel (PBCH) or a Physical Data Shared Channel (PDSCH)). According to another embodiment, among the fields listed in Table 1, some fields may be delivered through system information, and the remaining some fields may be delivered through control information.

When transmission scheme-related information is delivered through an RRC configuration message, the RRC configuration message may include at least one of the fields includable in DCI listed in Table 1. An RRC configuration message may be transmitted through a separate physical channel (e.g., a PDSCH). According to another embodiment, among the fields listed in Table 1, some fields may be delivered through an RRC layer message, and the remaining some fields may be delivered through DCI. According to still another embodiment, among the fields listed in Table 1, some fields may be delivered through system information, some other fields may be delivered through an RRC layer message, and the remaining some fields may be delivered through DCI.

According to yet another embodiment, transmission scheme-related information may be indicated through a TM. The system may define multiple TMs. Among multiple TMs, a first TM may be defined as a TM using BICM and Gray mapping, and a second TM may be defined as a TM using MLC and natural mapping. The remaining transmission scheme-related information, which is not indicated through a TM, may be delivered through at least one of DCI, system information, and an RRC layer message.

A TM may be applied to various physical channels (e.g., a PDSCH and a Physical Uplink Shared Channel (PUSCH)). It is possible to notify each receiving node of a TM through higher layer (e.g., an RRC layer) signaling. Alternatively, a TM may be commonly applied to all the receiving nodes.

Also, a TM and DCI may be associated with each other. For example, a format of DCI may indicate a TM. For example, a first format of DCI may indicate a first TM, and a second format of DCI may indicate a second TM. In the present example, when DCI having the first format is received, the receiving node 120 may determine that the first TM is applied.

Also, a TM and a control channel (e.g., a PDCCH) may be associated with each other. For example, a format of a control channel may indicate a TM. For example, a first format of a control channel may indicate a first TM, and a second format of a control channel may indicate a second TM. In the present example, when control information is received through a control channel having the first format is received, the receiving node 120 may determine that the first TM is applied.

Further, a TM and a search space of a control channel may be associated with each other. For example, a format of a search space of a control channel may indicate a TM. For example, a first search space of a control channel may indicate a first TM, and a second search space of a control channel may indicate a second TM. In the present example, when a control channel is checked in the first search space, the receiving node 120 may determine that the first TM is applied.

In the above-described various embodiments, a transmission scheme is selected by the transmitting node 110. According to another embodiment, a transmission scheme may be selected by the receiving node 120. In the present example, the receiving node 120 may receive transmitter-related capability information of the transmitting node 110, may select a transmission scheme to be used by the transmitting node 110, and then may transmit, to the transmitting node 110, control information for notification of the transmission scheme. For example, in a situation in which the transmitting node 110 as a terminal and the receiving node 120 as a base station perform uplink communication, the receiving node 120 may determine a transmission scheme of the transmitting node 110. In the present example, a configuration, a delivery format, and the like of control information for notification of a transmission scheme may follow according to at least one of the above-described various embodiments.

Methods according to claims of the present disclosure or embodiments described in the specification thereof may be implemented in hardware, software, or as a combination of hardware and software.

When the methods are implemented in software, a computer-readable storage medium configured to store one or more programs (software modules) may be provided. The one or more programs stored in the computer-readable storage medium may be configured to be executable by one or more processors within an electronic device. The one or more programs may include instructions that cause the electronic device to perform the methods according to claims of the present disclosure or embodiments described in the specification thereof.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), a Digital Versatile Disc (DVD), other type optical storage devices, or a magnetic cassette. Alternatively, the programs may be stored in a memory implemented by a combination of some or all of the above-described memories. Further, the electronic device may include a plurality of such memories.

Also, the programs may be stored in an attachable storage device which may access the electronic device through a communication network, such as the Internet, the Intranet, a Local Area Network (LAN), a Wide LAN (WLAN), or a Storage Area Network (SAN), or through a communication network implemented by a combination thereof. Such a storage device may access an apparatus configured to perform embodiments of the present disclosure via an external port. Further, a separate storage device on the communication network may access an apparatus configured to perform embodiments of the present disclosure.

In the above-described specific embodiments of the present disclosure, an element included in the present disclosure is expressed in a singular or plural form according to a presented specific embodiment. However, the singular or plural expression is appropriately selected according to the presented situation for convenience of description, and the present disclosure is not limited to a single element or multiple elements thereof. An element expressed in the plural form may be configured as a single element, or an element expressed in the singular form may be configured as multiple elements.

While specific embodiments have been described in the detailed description of the present disclosure, it goes without saying that various changes can be made within a limit without departing from the scope of the present disclosure. Therefore, the scope of the present disclosure should not be limited to and defined by the above-described embodiments, and should be defined not only by the appended claims but also by the equivalents to the scope of the claims.

The invention claimed is:

1. A method performed by a first device in a wireless communication system, the method comprising:
receiving, from a second device, capability information of the second device indicating a signal processing rule required to use an integer forcing (IF) reception algorithm using an effective channel matrix converted into an integer matrix by using an equalization matrix;
transmitting, to the second device, control information on a transmission scheme for processing data determined based on the capability information; and
transmitting, to the second device, a data signal generated using the transmission scheme,
wherein the capability information comprises at least one of a rule for combination of channel coding and modulation or a rule for bit-to-symbol mapping.

2. The method of claim 1, wherein the transmission scheme comprises at least one signal processing rule which is a condition for use of a reception algorithm which is usable by the second device and is identified by the capability information.

3. The method of claim 1, wherein the transmission scheme comprises at least one of:
multi-level coding (MLC) which maps, to one modulated symbol, bits extracted from multiple different encoded code blocks, or
a natural mapping which maps a bit value and a constellation point so that a value represented by bits is increased by one according an order of a constellation points in an identical domain.

4. The method of claim 1, wherein the control information comprises at least one of:
a rule combination of channel coding and modulation,
a rule for bit-to-symbol mapping,
a resource element (RE) mapping rule,
a resource block (RB) allocation rule, or
a reference signal (RS) allocation rule.

5. The method of claim 4, wherein:
the RE mapping rule indicates one of time-first mapping or frequency-first mapping;
the RB allocation rule indicates one of time-first allocation or frequency-first allocation; and
the RS allocation rule indicates one of time-RS allocation or frequency-RS allocation.

6. A second device in a wireless communication system, the second device comprising:
a transceiver configured to:
transmit, to a first device, capability information of the second device indicating a signal processing rule required to use an integer forcing (IF) reception algorithm using an effective channel matrix converted into an integer matrix by using an equalization matrix, receive, from the first device, control information on a transmission scheme for processing data determined based on the capability information, and receive, from the first device, a data signal generated using the transmission scheme, wherein the capability information comprises at least one of a rule for combination of channel coding and modulation or a rule for bit-to-symbol mapping.

7. The second device of claim 6, wherein the transmission scheme comprises at least one signal processing rule which is a condition for use of a reception algorithm which is usable by the second device and is identified by the capability information.

8. The second device of claim 6, wherein the transmission scheme comprises at least one of:

multi-level coding (MLC) which maps, to one modulated symbol, bits extracted from multiple different encoded code blocks, or a natural mapping which maps a bit value and a constellation point so that a value represented by bits is increased by one according an order of a constellation points in an identical domain.

9. The second device of claim 6, wherein the control information comprises at least one of:

a rule combination of channel coding and modulation, a rule for bit-to-symbol mapping, a resource element (RE) mapping rule, a resource block (RB) allocation rule, or a reference signal (RS) allocation rule.

10. The second device of claim 9 wherein:

the RE mapping rule indicates one of time-first mapping or frequency-first mapping;

the RB allocation rule indicates one of time-first allocation or frequency-first allocation; and the RS allocation rule indicates one of time-RS allocation or frequency-RS allocation.

11. The second device of claim 10 wherein:

the time-first mapping and the time-first allocation are selected when a frequency-axis channel variation is larger than a time-axis channel variation; and the time-RS allocation is selected when a time-axis channel variation is larger than a frequency-axis channel variation.

12. A first device in a wireless communication system, the first device comprising:

a transceiver configured to:

receive, from a second device, capability information of the second device indicating a signal processing rule required to use an integer forcing (IF) reception algorithm using an effective channel matrix converted into an integer matrix by using an equalization matrix, transmit, to the second device, control information on a transmission scheme for processing data determined based on the capability information, and transmit, to the second device, a data signal generated using the transmission scheme, wherein the capability information comprises at least one of a rule for combination of channel coding and modulation or a rule for bit-to-symbol mapping.

13. The first device of claim 12, wherein the transmission scheme comprises at least one signal processing rule which is a condition for use of a reception algorithm which is usable by the second device and is identified by the capability information.

14. The first device of claim 12, wherein the transmission scheme comprises at least one of:

multi-level coding (MLC) which maps, to one modulated symbol, bits extracted from multiple different encoded code blocks, or a natural mapping which maps a bit value and a constellation point so that a value represented by bits is increased by one according an order of a constellation points in an identical domain.

15. The first device of claim 14, wherein the control information comprises at least one of:

a rule combination of channel coding and modulation, a rule for bit-to-symbol mapping, a resource element (RE) mapping rule, a resource block (RB) allocation rule, or a reference signal (RS) allocation rule.

16. The first device of claim 15 wherein:

the RE mapping rule indicates one of time-first mapping or frequency-first mapping;

the RB allocation rule indicates one of time-first allocation or frequency-first allocation; and the RS allocation rule indicates one of time-RS allocation or frequency-RS allocation.

17. The first device of claim 16 wherein:

the time-first mapping and the time-first allocation are selected when a frequency-axis channel variation is larger than a time-axis channel variation; and the time-RS allocation is selected when a time-axis channel variation is larger than a frequency-axis channel variation.

\* \* \* \* \*